US006860689B1

(12) United States Patent  (10) Patent No.: US 6,860,689 B1
Attanasio                   (45) Date of Patent:     Mar. 1, 2005

(54) FASTENING ASSEMBLIES AND COMPONENTS THEREOF

(75) Inventor: Gerard E. Attanasio, Middlebury, CT (US)

(73) Assignee: Pilgrim Screw Corporation, Providence, RI (US)

(*) Notice: Subject to any disclaimer, the term of this patent is extended or adjusted under 35 U.S.C. 154(b) by 0 days.

(21) Appl. No.: 10/137,011

(22) Filed: May 2, 2002

Related U.S. Application Data

(60) Provisional application No. 60/288,253, filed on May 2, 2001, provisional application No. 60/338,930, filed on Mar. 14, 2002, and provisional application No. 60/352,059, filed on Jan. 25, 2002.

(51) Int. Cl.[7] .............................................. F16B 21/18
(52) U.S. Cl. ......................... 411/353; 411/418; 411/999
(58) Field of Search .................................. 411/352, 353, 411/999, 107, 111, 112, 437, 433, 438, 417–422, 217–221

(56) References Cited

U.S. PATENT DOCUMENTS

| 2,144,553 A | * | 1/1939 | Simmonds ................... 411/111 |
| 2,323,260 A | | 6/1943 | Venditty |
| 2,356,162 A | | 8/1944 | Johnson et al. |
| 2,385,893 A | | 10/1945 | Taylor |
| 2,394,491 A | | 2/1946 | Schaper |
| 2,423,432 A | | 7/1947 | Barlow |
| 2,486,411 A | | 11/1949 | Huelster |
| 2,567,864 A | | 9/1951 | Becker |
| 2,640,245 A | | 6/1953 | Becker |
| 2,730,154 A | | 1/1956 | Aspey |
| 2,737,222 A | * | 3/1956 | Becker ........................ 411/105 |
| 2,843,907 A | | 7/1958 | Zahodiakin |
| 2,922,211 A | | 1/1960 | Boyd |
| 2,975,667 A | | 3/1961 | Bross |
| 2,984,884 A | | 5/1961 | Chapman et al. |
| 3,141,487 A | * | 7/1964 | Boyd .......................... 411/105 |
| 3,504,875 A | | 4/1970 | Johnson et al. |
| 3,783,922 A | | 1/1974 | Petrus |
| 4,069,855 A | | 1/1978 | Petroshanoff |
| 4,119,131 A | | 10/1978 | Cosenza |
| 4,128,923 A | | 12/1978 | Bisbing |
| 4,232,496 A | | 11/1980 | Warkentin |
| 4,324,517 A | | 4/1982 | Dey |
| 4,616,967 A | | 10/1986 | Molina |
| 4,723,881 A | | 2/1988 | Duran |
| 4,828,442 A | | 5/1989 | Duran |
| 4,854,795 A | | 8/1989 | Duran |
| 4,865,500 A | | 9/1989 | Duran et al. |
| 4,884,930 A | | 12/1989 | Dobbeler |
| 4,975,007 A | | 12/1990 | Molina |
| 5,056,208 A | | 10/1991 | Stafford |
| 5,073,070 A | | 12/1991 | Chang |
| 5,137,406 A | | 8/1992 | Cosenza |
| 5,338,139 A | | 8/1994 | Swanstrom |
| 5,380,136 A | * | 1/1995 | Copple et al. ............... 411/183 |
| 5,405,228 A | * | 4/1995 | Reid et al. ................... 411/183 |
| 5,688,093 A | | 11/1997 | Bowers |
| 5,690,460 A | | 11/1997 | Attanasio |
| 5,860,779 A | * | 1/1999 | Toosky et al. ............... 411/432 |
| 6,059,502 A | | 5/2000 | Konig et al. |

* cited by examiner

Primary Examiner—Flemming Saether
Assistant Examiner—Jori Schiffman
(74) Attorney, Agent, or Firm—Salter & Michaelson

(57) ABSTRACT

A fastening assembly is provided. The fastening assembly includes provision for a stud to be positioned in a plurality of predetermined extended positions, minimizing the amount of clearance required for removing a cover from a substructure.

14 Claims, 40 Drawing Sheets

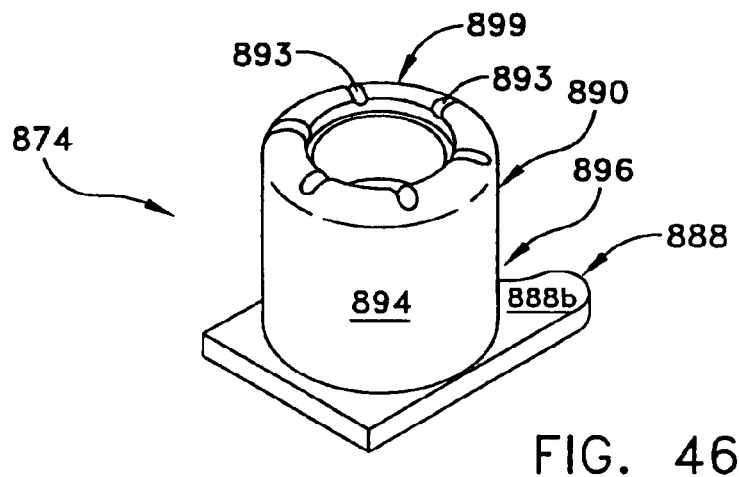
FIG. 46
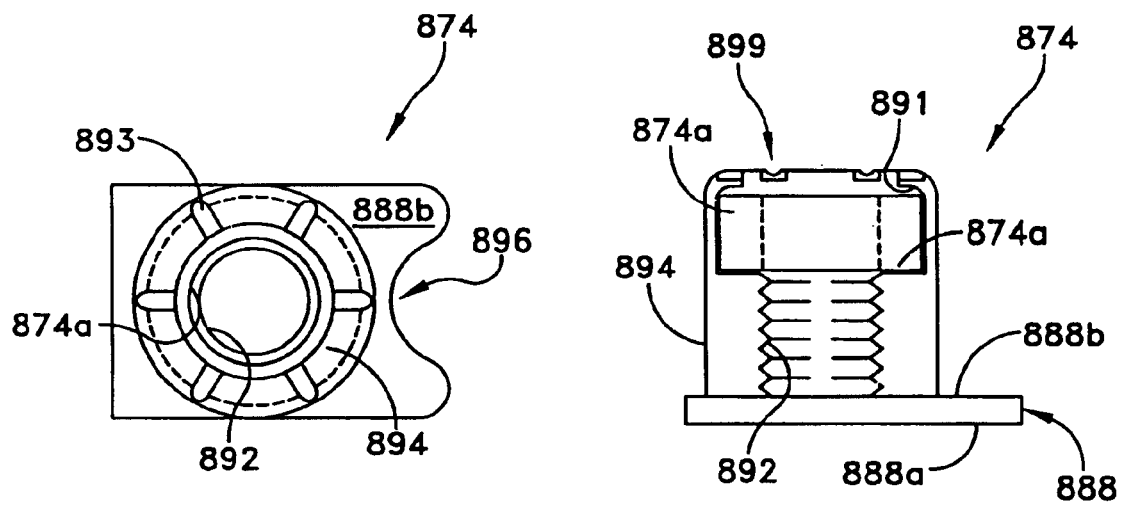
FIG. 47
FIG. 49
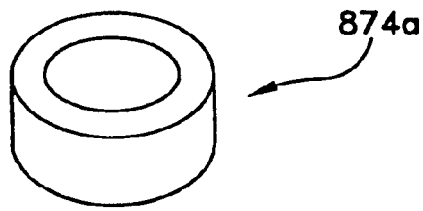
FIG. 48

FASTENING ASSEMBLIES AND COMPONENTS THEREOF

RELATED CASES

Priority is hereby claimed under 35 U.S.C. § 119(e) to commonly owned and U.S. Provisional Patent Application No. 60/288,253, filed on May 2, 2001,now abandoned; to commonly owned U.S. Provisional Patent Application No. 60/338,930, filed on Mar. 14, 2002,now abandoned; and to commonly owned and U.S. Provisional Patent Application No. 60/352,059, filed on Jan. 24, 2002, now abandoned each of which is incorporated herein by reference in its entirety.

BACKGROUND

1. Technical Field

This disclosure relates generally to a fastening assembly and components of the fastening assembly and, more particularly, to a structural fastener assembly and components of such a fastening assembly, which maybe for attaching a cover or panel to a substructure, particularly in high stress environments.

2. Related Art

A variety of fastener assemblies are known for attaching a panel to a substructure, for example, such as attaching a panel to an aircraft structure. Such fastening assemblies are typically designed for use in high stress environments, such as to protect aircraft access panels, and when used in such environments, are referred to as structural fasteners or structural fastening assemblies. Such structural fastening assemblies must be able to maintain secure attachment of the panel to the substructure panel during conditions of excessive vibration and high loads applied to the panel during flight.

The studs of captive fastening assemblies remain captive in the stud assembly when the panel is removed. Therefore, when the panels are removed from the substructure, the studs remain with the cover, maintaining the position of the studs relative to the panel and eliminating the problem of stud loss or displacement. In general, the studs of captive fastening assemblies only can be extended from the stud assembly to one position. This is problematic when the clearance required to remove a panel is minimal. In such situations, the studs must be removed from the fastening assembly, which is problematic because it is easy to lose, drop and confuse the studs, and thereafter it is difficult to tell which fasteners the studs belong to when reattaching the panel to the substructure. One way this has been addressed is to use studs of varying length so that the amount of stud exposed underneath the panel after the stud is extended can be varied.

Many existing captive fastening assemblies are also quite delicate and are unable to withstand the force associated with the use of pneumatic drills, which increases the amount of time required to remove and re-install panels. Some fastening assemblies have reduced life due to breakage of retaining rings, as well as other components of the assemblies. When the retaining ring breaks, depending on the design of the fastener, it often may result in the screw or stud falling out of the assembly, defeating the purpose of using a "captive" fastener assembly. Another common type of failure is due to "foreign object debris" (FOD), which is common in fastening assemblies that include a hole in the stud or screw which becomes filled with debris over time.

SUMMARY

The present disclosure provides a fastening assembly that includes a "holdout" feature that allows a stud to be removed or extended from a fastening assembly at several predetermined positions, allowing panels to be removed while retaining the positions of the screws. This is especially desirable when removing curved panels from a curved substructure, for example, when it is desirable to have the studs on the curved portions of the cover removed or extended by a greater amount than those on the flat or planar portion of the cover to provide additional clearance when removing the cover from the substructure. Another feature of the present disclosure is the provision of a fastener with evenly distributed forces along the grommet assembly, rather that localized distribution of force at the tip of a stud. This results in a secure fit of the stud within the grommet assembly and decreases the chance that the stud may be inadvertently released from its captive position.

The fastening assemblies of the present disclosure may also be configured and dimensioned to have a reduced "footprint" for use in relatively small and/or inaccessible areas.

In one embodiment, the present disclosure is directed to a fastening assembly that includes a stud that may be positioned in a plurality of predetermined extended positions while being maintained in a captive position within the stud assembly. The fastening assembly includes a grommet assembly for attachment to a cover, which includes a retaining ring having inwardly extending tabs. A plurality of engagement members, which may be lobes or ribs, are disposed within longitudinally extending channels of a stud. The lobes or ribs engage with the tabs of the retaining ring. As the stud is inserted or removed, the tabs slide within the channels of the stud, engaging successive lobes or ribs. Such a structure allows the stud to remain captive in the stud assembly during removal of a cover from a panel, and further allows the stud to have several extended predetermined positions. This is advantageous when the clearance between the panel and the cover is minimal, and it is desirable to remove the stud as far as possible from the stud assembly while maintaining the stud in a captive position.

In another embodiment, the fastening assembly includes a nut that includes a plurality of flanges. Preferably, the nut is constructed form a material having a memory, such as a shape memory alloy, which allows it to flex or spring back to its original shape after being subjected to a force. The construction and material of the nut allows the force exerted on a stud when it is inserted into a grommet assembly to be distributed substantially evenly along the length of the nut, rather than being localized at one end of the nut.

In another embodiment, the fastening assembly includes a receptacle that may be attached to a cover using a single bolt or rivet, and in which the nut is secured into the receptacle with tabs at one end and with a retaining clamp positioned substantially perpendicular to the cover at the opposing end.

In another embodiment, the fastening assembly includes a receptacle that includes a sealed nut unit, which allows the fastening assembly to be used in regions in which there is a pressure differential.

BRIEF DESCRIPTION OF THE DRAWINGS

In the drawings:

FIG. 46 is a perspective view of another embodiment of a nut;

FIG. 47 is a top view of the nut of FIG. 46;

FIG. 48 is a schematic side view of the nut of FIG. 47;

FIG. 49 is a perspective view of the nut element of FIG. 48;

DETAILED DESCRIPTION OF THE PREFERRED EMBODIMENTS

The present disclosure is directed to a fastening assembly that may be used in high stress environments for attaching a cover to a panel, such as covers used to close access openings in panels of an aircraft. In some embodiments, the present fastening assemblies may include stud assemblies that allow the stud to be positioned in several predetermined extended positions while remaining captive within the stud assembly. Such a feature is useful, for example, when curved covers are attached to curved panels using a plurality of fastening assemblies, each of which may require different stud clearances in order to remove the cover from the panel. In some embodiments, the fastening assembly may include a nut that provides even distribution of stress along the nut.

In other embodiments, the fastening assembly may be configured and dimensioned to be attached to a panel using a single bolt or rivet, which allows the fastening assembly to be used in otherwise inaccessible regions. In other embodiments, the fastening assembly may include a sealed housing allowing it to be used where pressure differentials occur.

Figure 1:
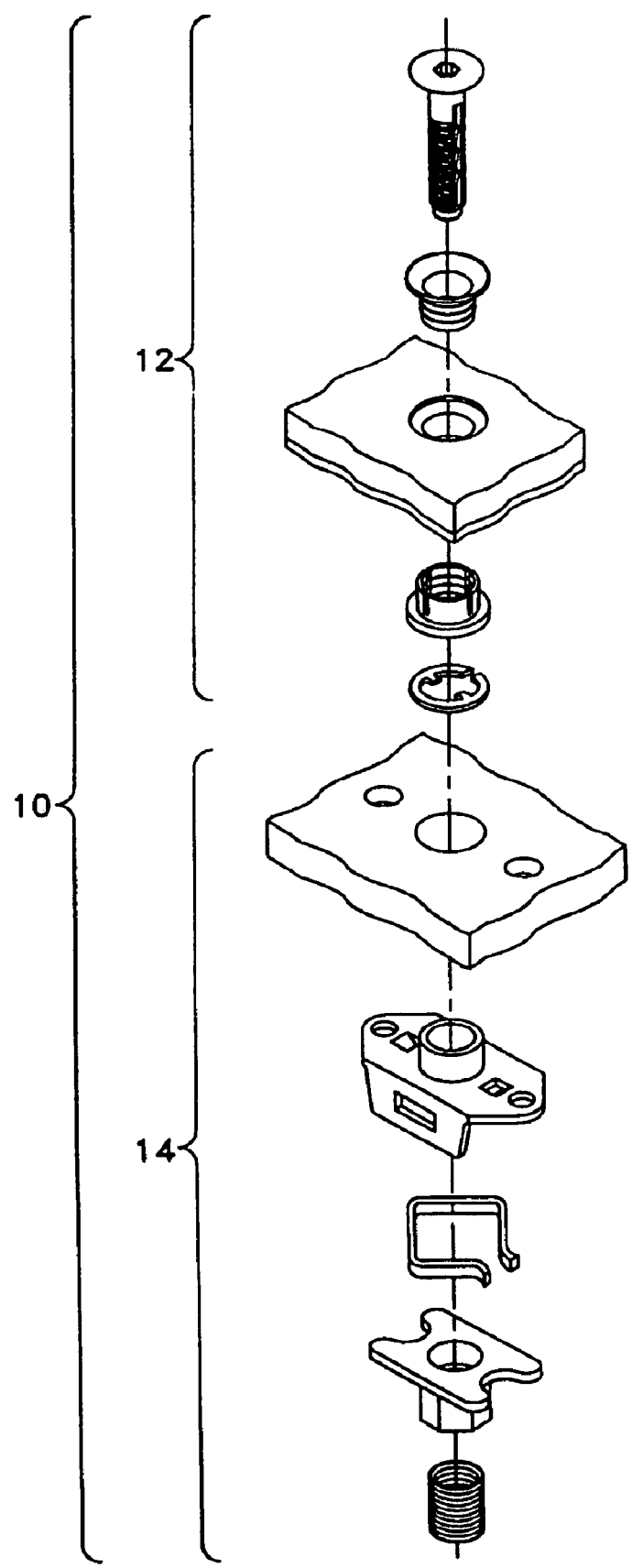
FIG. 1 is an exploded view of one embodiment of a fastening assembly according to the present disclosure.
Figure 2:
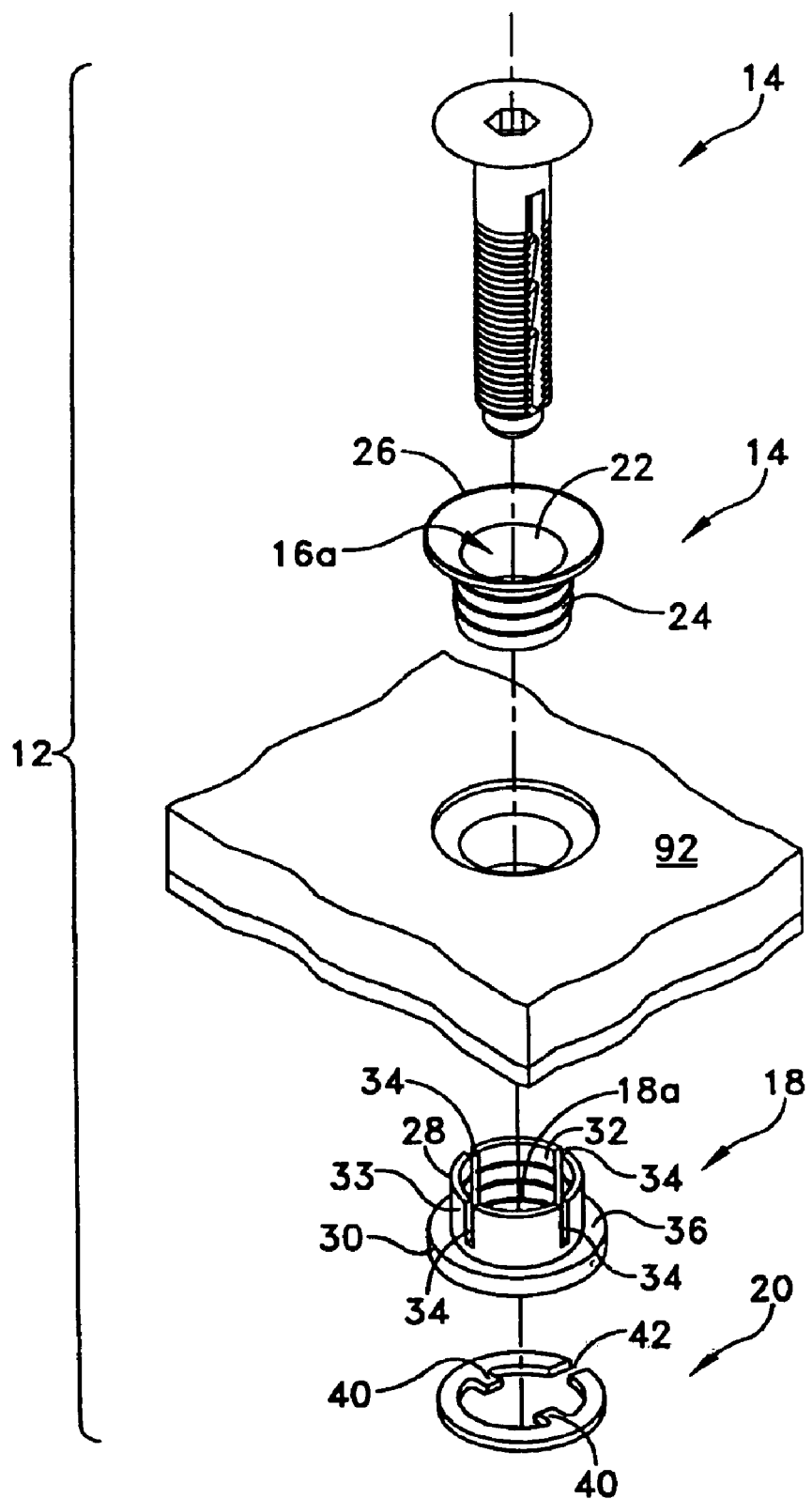
FIG. 2 is an exploded view of the stud assembly of the fastening assembly shown in FIG. 1.

One embodiment of a fastening assembly according to the present disclosure is indicated generally at 10 in FIG. 1. As shown, fastening assembly 10 includes a stud assembly indicated generally at 12 and a receptacle assembly indicated generally at 14. Stud assembly 12 is illustrated in greater detail in FIG. 2. As shown, stud assembly 12 includes a stud 14, an upper sleeve 16, a lower sleeve 18, and a retaining ring 20.

Upper sleeve 16 has a substantially cylindrical wall defining an opening 16a having a diameter sized and configured to receive stud 14 therein. Upper sleeve 16 has a substantially smooth interior surface 22 and a threaded exterior surface 24. A flange 26 extends outwardly from one end of an opening 16a.

Lower sleeve 18 also has a substantially cylindrical wall defining an opening 18a sized and dimensioned to receive upper sleeve 16 therein. Lower sleeve 18 has a substantially smooth exterior surface 33 and a threaded interior surface 32 with a plurality of channels 34 extending from annular lip 30 to an upper end 28. Lower sleeve 18 also includes an annular lip 30 defining an interior channel 31 (see FIG. 2A) sized and dimensioned to receive retaining ring 20 therein.

Retaining ring 20 preferably has a substantially planar circular shape and includes two opposed inwardly protruding tabs 40 and a slot 42 that allow it to be compressed while being inserted into the interior channel 31 of lower sleeve 18.

Figure 2A:
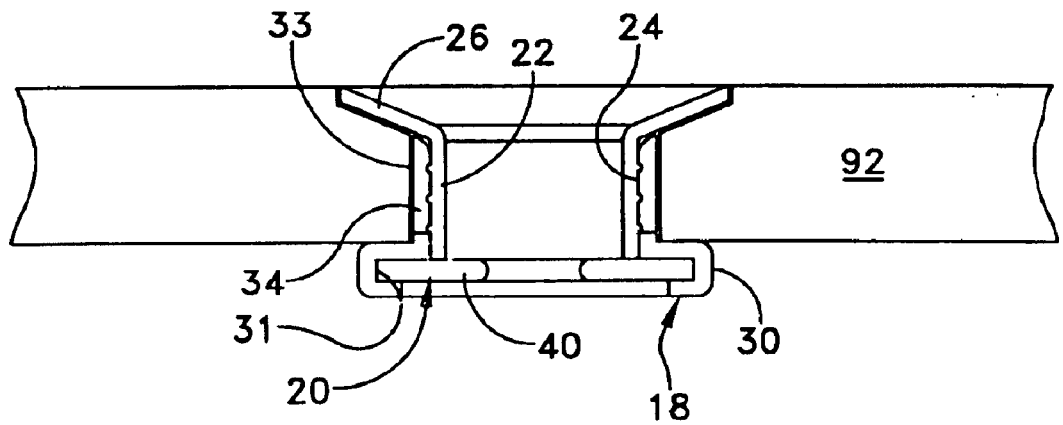
FIG. 2A is a sectional view showing the engagement of the upper and lower sleeves of the stud assembly.
Figure 2B:
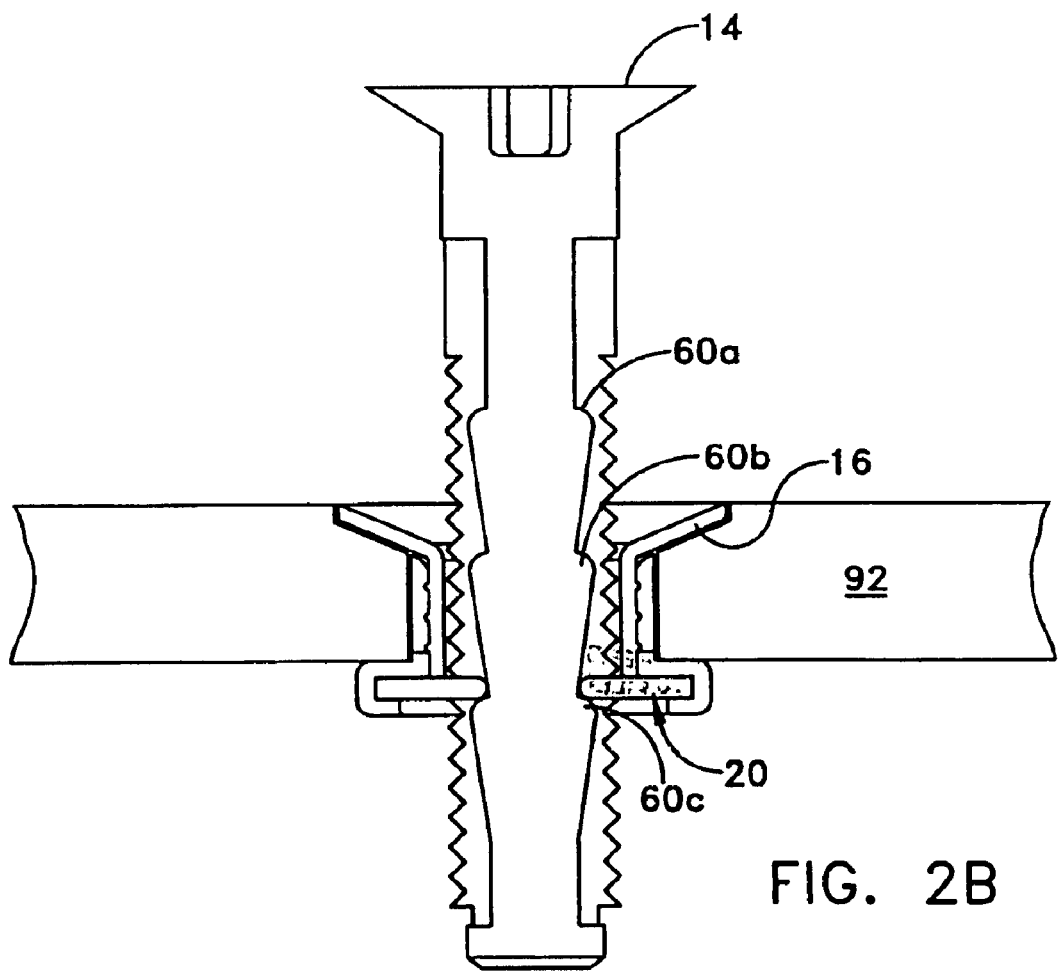
FIG. 2B is a sectional view showing the engagement of the retaining ring inserted into the channel of the lower sleeve of the stud assembly.

As shown in FIG. 2A, when assembled, lower sleeve 18 is inserted into an aperture (not illustrated) such as a cover 92, and upper sleeve 16 is threaded into lower sleeve 18. Retaining ring 20 is then inserted into interior channel 31 of lower sleeve 18.

Figure 3:
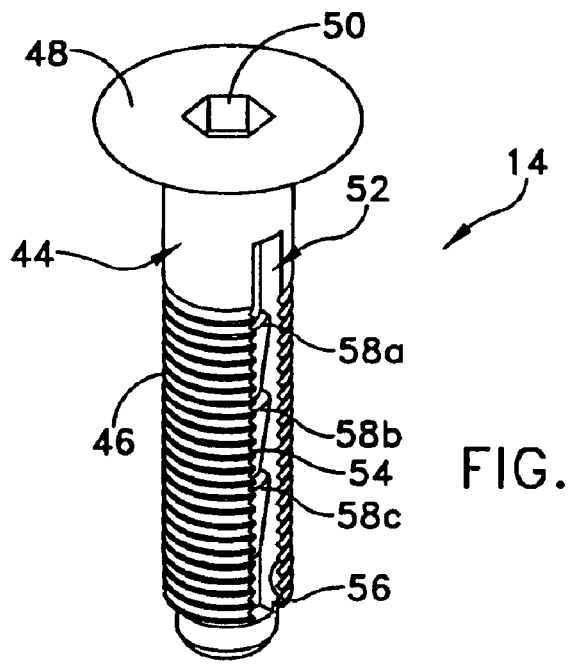
FIG. 3 is a perspective view of the stud shown in the stud assembly shown in FIG. 2.
Figure 4:
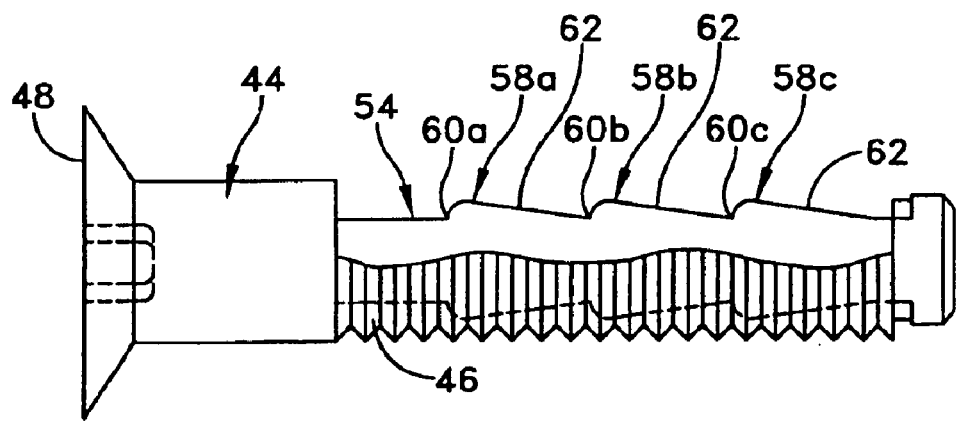
FIG. 4 is a sectional view of the stud shown in FIG. 2.
Figure 5:
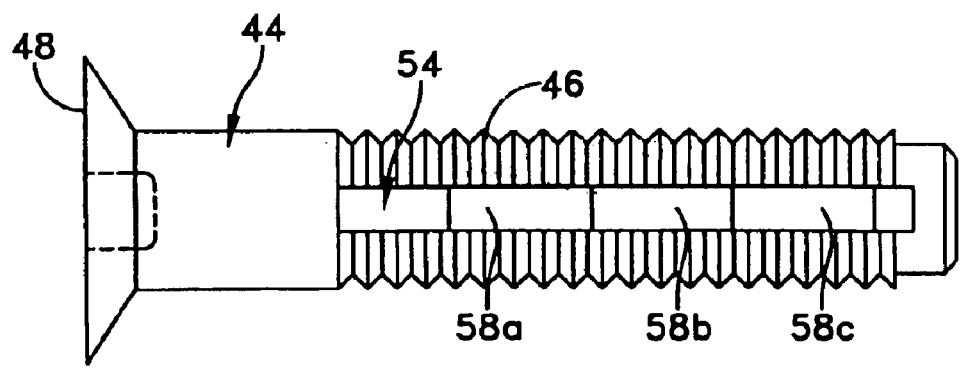
FIG. 5 is a side view of the stud shown in FIG. 2.

Stud 14 of stud assembly 12 is shown in greater detail in FIGS. 3–5. As shown, stud 14 is substantially symmetrical in construction, and includes a shank portion 44 having a threaded exterior surface 46 and a head 48 which includes a recess 50 for receiving a tool. Shank portion 44 includes two engagement sections 52 which may be recessed, as shown in the present embodiment, where engagement section 52 is defined by a channel. For ease of illustration, engagement sections 52 will be referred to hereinafter as channels.

Preferably, each channel 52 includes at least two engagement members 58 adapted to engage the inwardly protruding tabs 40 of retaining ring 20 when the stud and fastening assemblies are assembled together. In the present embodiment, channel 52 includes three engagement members 58a,b,c that protrude outwardly from an inner surface 54 of each channel 52. In the present embodiment, engagement members 58a,b,c have a generally arcuate shape, such as a lobe. For ease of illustration, engagement members 58a,b,c will be referred to hereinafter as lobes.

Each lobe 58a,b,c includes a shoulder 60a,b,c and a substantially smooth. continuous section 62 that extends to and intersects an adjacent shoulder. As will be shown in greater detail below, tabs 40 of retaining ring 20 may be repositioned to engage each shoulder 60a,b,c, in order to position stud 14 in a plurality of predetermined engaged positions. Tabs 40 may be moved over surfaces 62 to a predetermined engaged position different than the first, by retracting or inserting stud 14 longitudinally in the fastening assembly until tabs 40 engage a different shoulder 60a,b,c.

Figure 6:
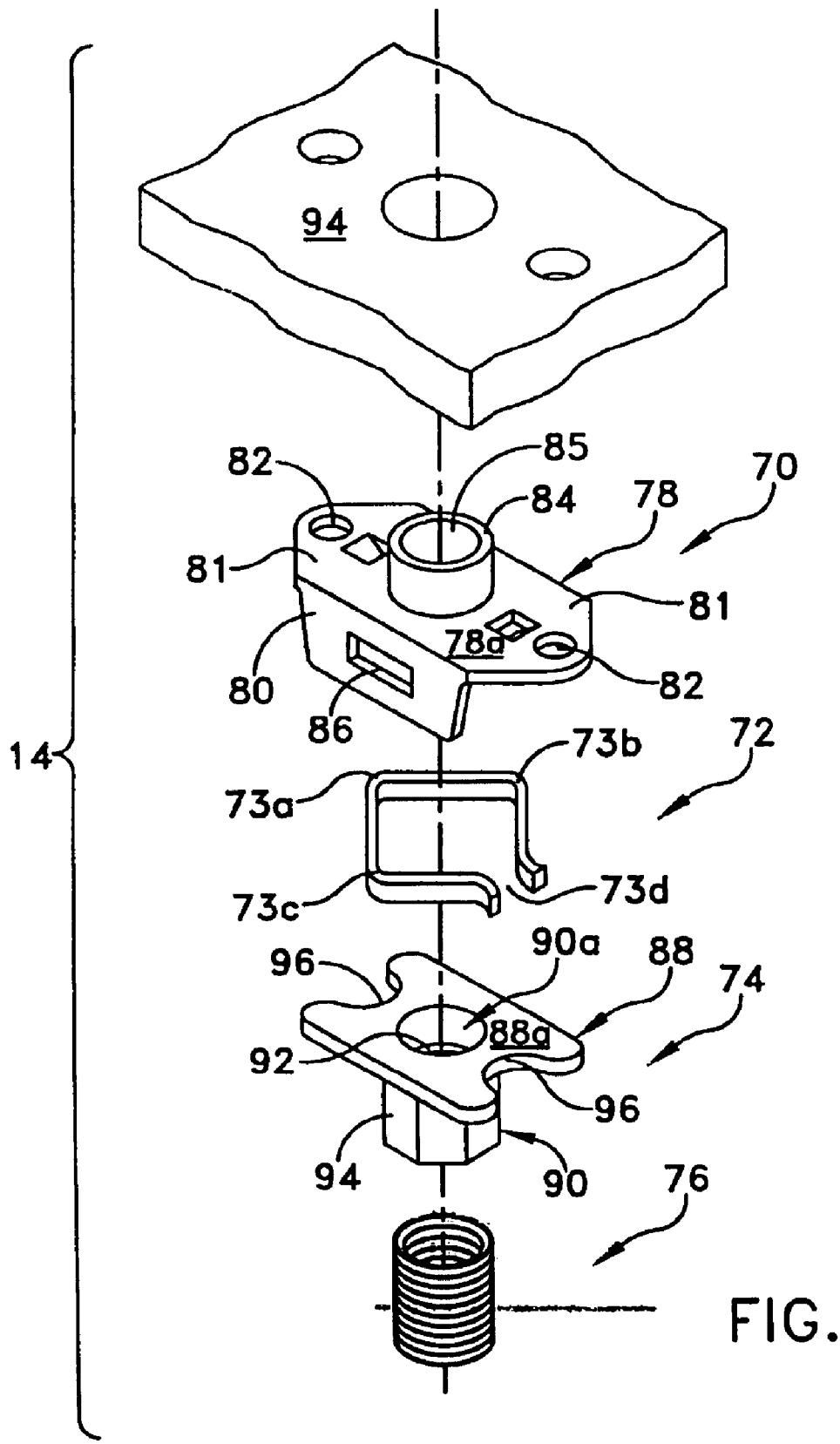
FIG. 6 is an exploded view of the receptacle of the fastening assembly shown in FIG. 1.

Receptacle assembly 14 is illustrated in greater detail in FIG. 6. As shown, receptacle assembly 14 includes a bracket 70, a retaining clamp 72, a nut 74, and a spring or coil 76. Bracket 70 includes a substantially planar upper portion 78 having an upper surface 78a and a lower surface 78b. Two opposed sidewalls 80 extend downwardly from upper portion 78. The substantially planar upper portion 78 includes opposed projections 81 extending outwardly therefrom. Each projection 81 includes a rivet bore 82 for securing bracket 70 to, for example, panel 94. Extending upwardly from upper portion 78 is a collar 84 which defines a bracket opening 85 for receiving stud 14 therethrough. Each sidewall 80 includes at least one slot 86 for receiving retaining clamp 72 as will be described in greater detail below. Bracket 70 may be unitary, as shown, or may be assembled from different components, as will be described in greater detail below. In addition, the length of collar 84 may vary in order to accommodate different substructure thicknesses, such as airframe thicknesses.

Retaining clamp 72 preferably has a substantially planar diamond or square shape with three closed corners 73a,b,c, and one open corner 73d. Two of the closed corners 73a,b act as engagement members for engaging slots 86 of bracket 70. Open corner 73d allows the retaining clamp to be compressed when being inserted into slots 86 of bracket 70.

Nut 74 includes a substantially planar upper portion 88 from which a barrel 90 having an internal bore 90a extends downwardly. Upper portion 88 includes an upper surface 88a and a lower surface 88b. Barrel 90 includes a threaded interior surface 92 and an exterior surface 94 that may be substantially cylindrical, or may have a substantially hexagonal shape as shown. Upper portion 88 includes opposing arcuate channels 96 that correspond substantially with rivet bores 82 of bracket 70. Threaded interior surface 92 of internal bore 90a is dimensioned and configured to receive coil 76, and thereafter to receive stud 14. Preferably, coil 76 may have a substantially diamond-shaped cross section which defines, for each coil, opposite, pointed side edges which are received within the grooves defining the female internal threads of bore 90a.

Figure 6A:
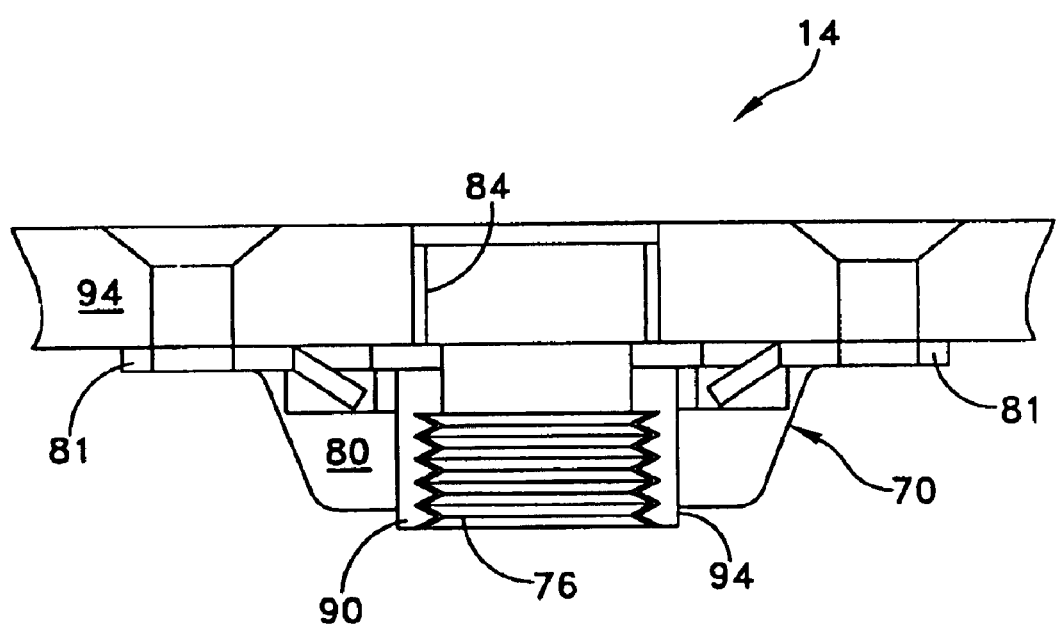
FIG. 6A is a side schematic view of the receptacle assembly.
Figure 7:
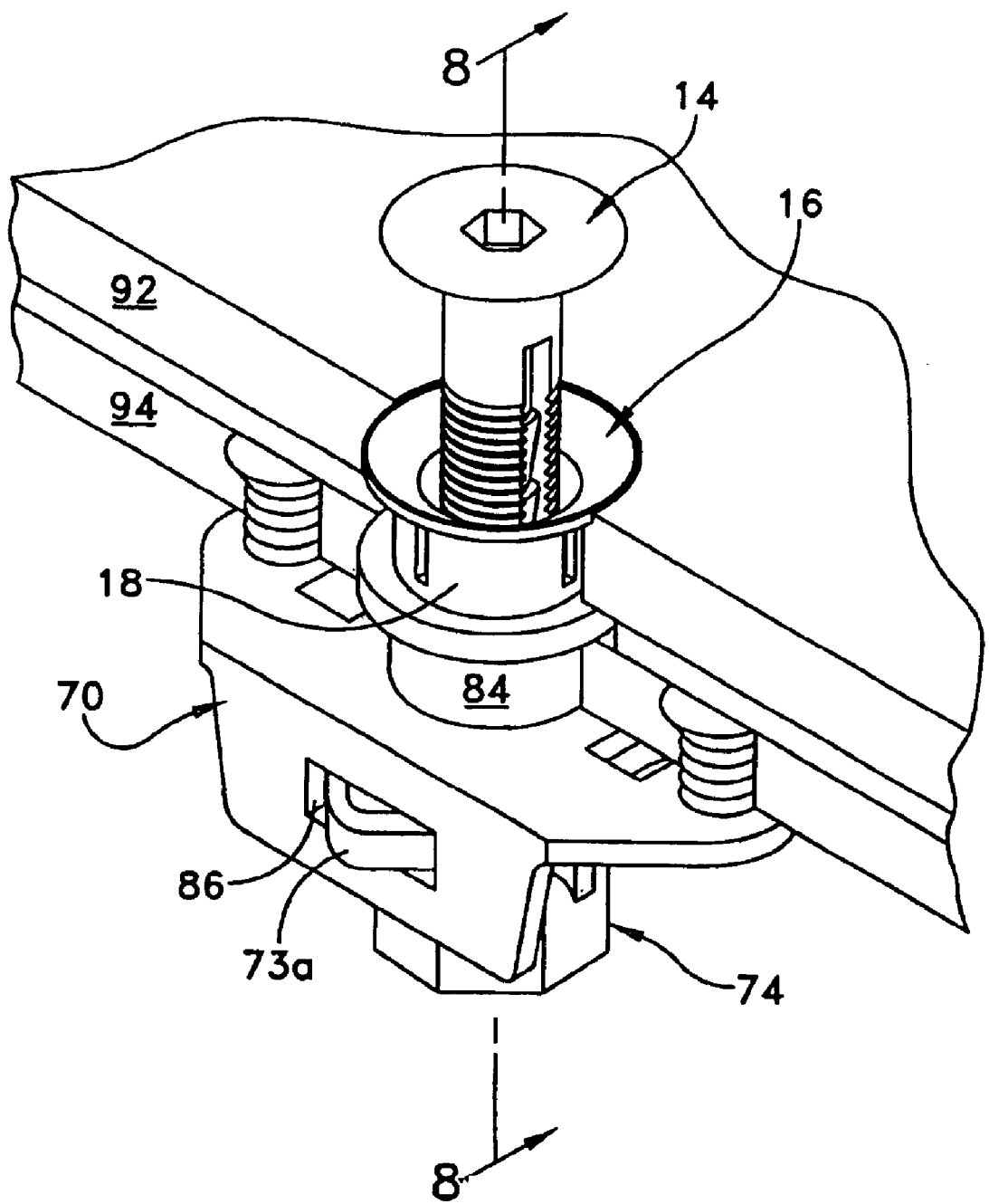
FIG. 7 is a perspective view of the fastening assembly of FIG. 1 in an assembled configuration.

When assembled, as shown in FIG. 6A, collar 84 of bracket 70 is inserted into an aperture (not illustrated) of a substructure such as panel 94, and attached thereto by rivets inserted into bores 82. FIG. 7 shows the receptacle assembly securing a cover to panel 94. Thereafter, nut 74 is slidably inserted into bracket 70 between opposing sidewalls 80, retaining clamp 72 is placed around barrel 90 and engaging corners 73a,b of retaining clamp 72 are engaged with slots 86 of bracket 70. Coil 76 then may be threaded into interior surface 92 of bore 90a.

Figure 8:
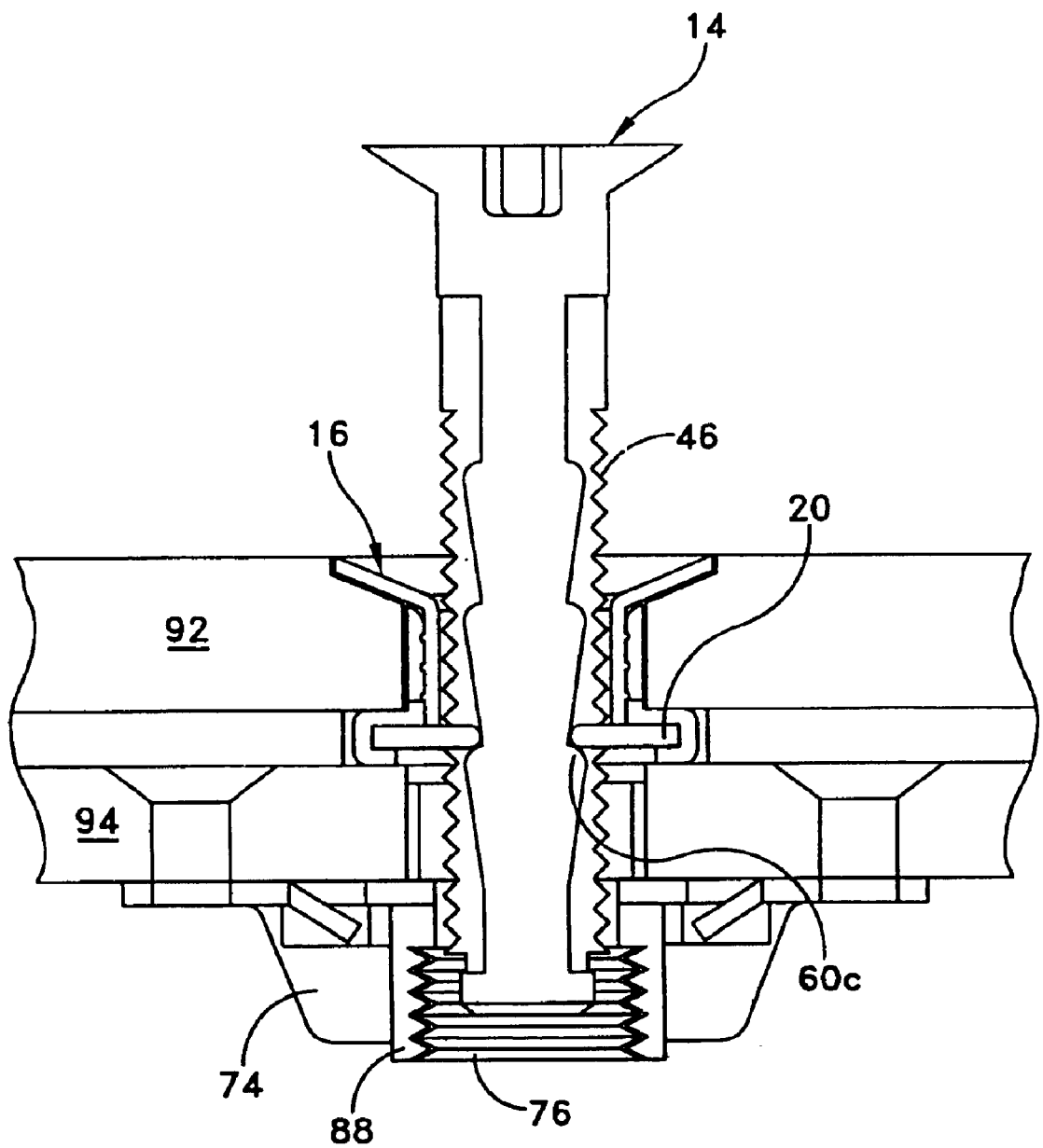
FIG. 8 is a sectional view of the fastening assembly of FIG. 7 with the stud in a first position.
Figure 9:
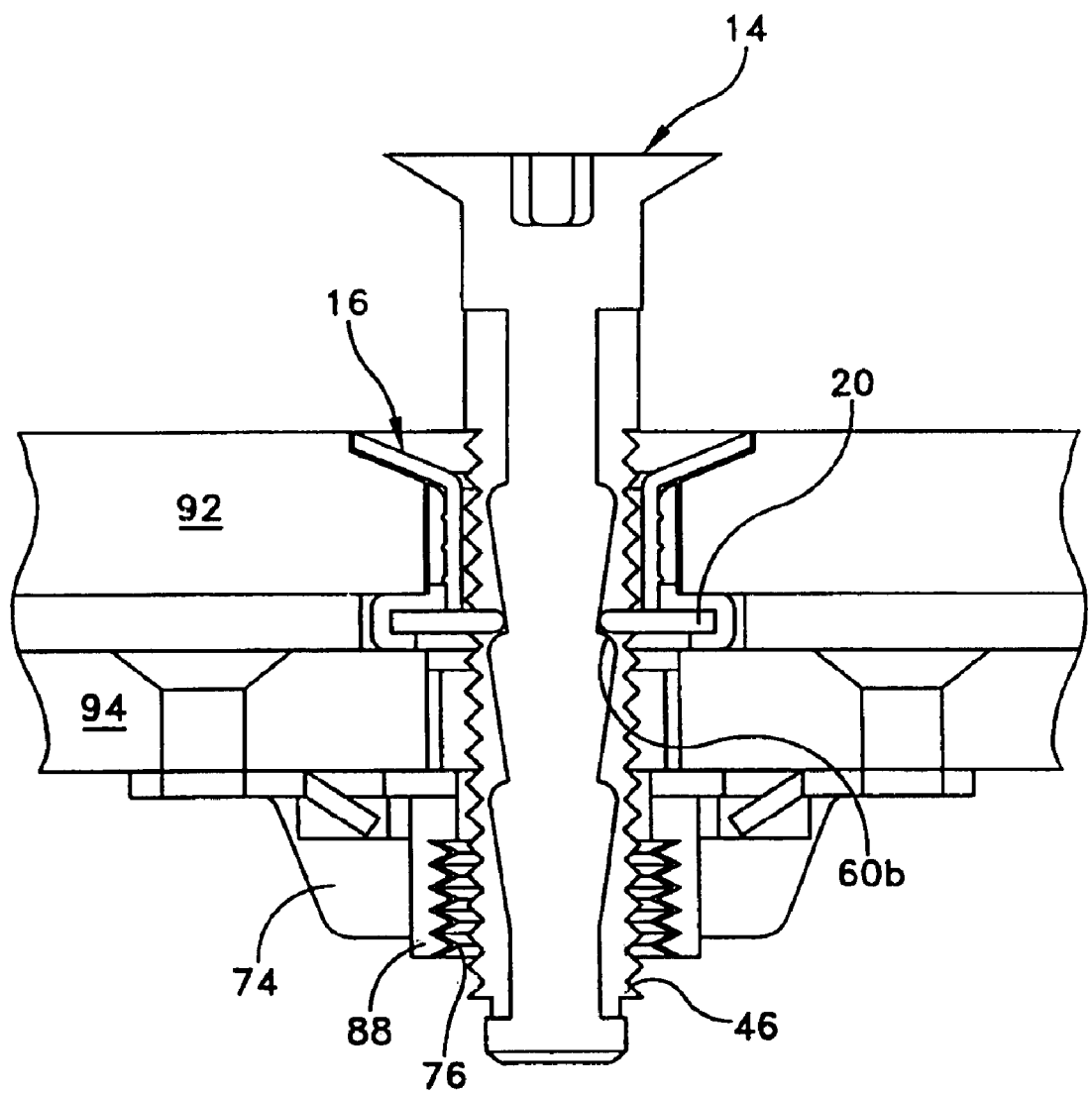
FIG. 9 is a sectional view of the fastening assembly of FIG. 7 with the stud in a second position.
Figure 10:
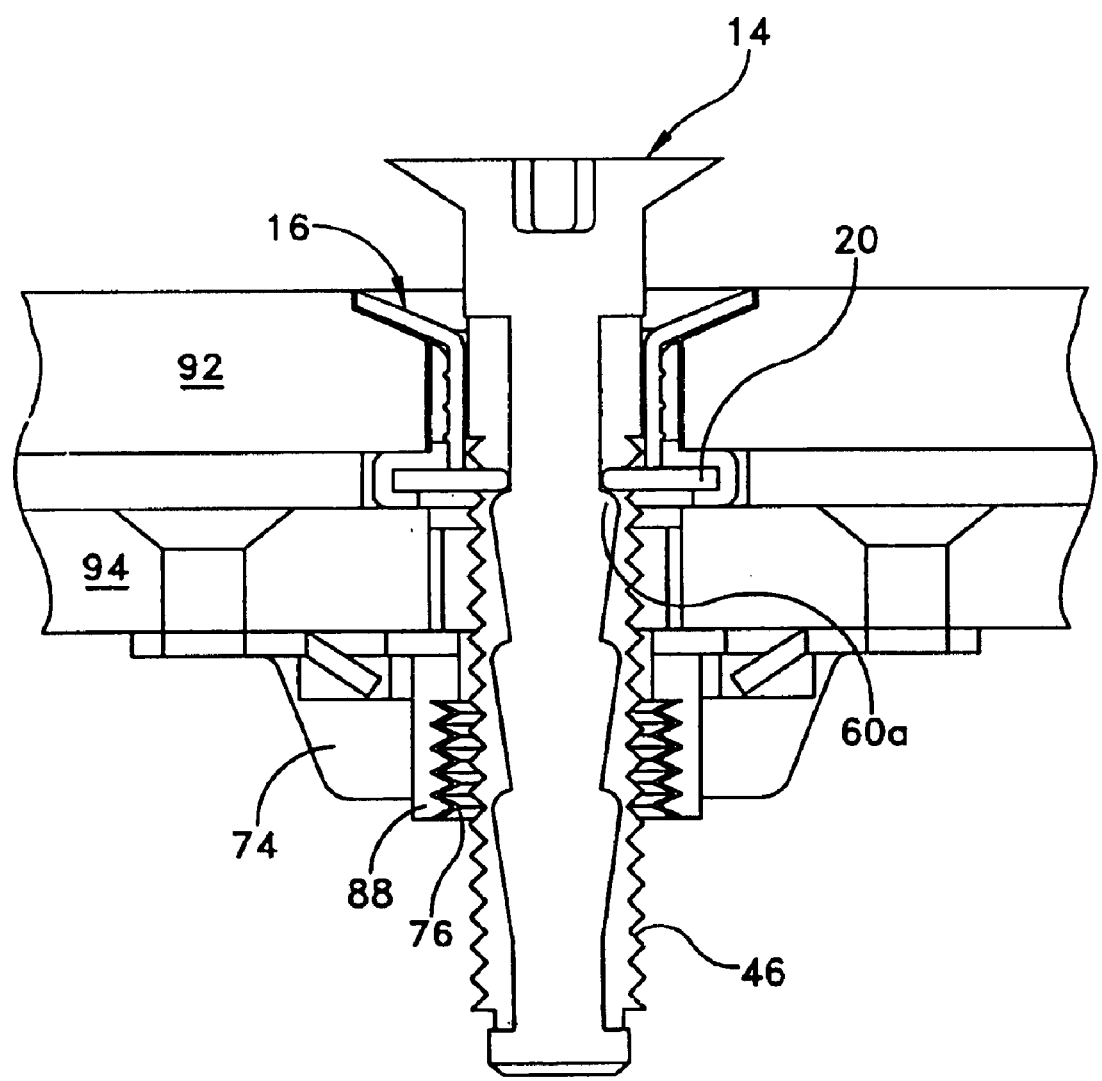
FIG. 10 is a sectional view of the fastening assembly of FIG. 7 with the stud in a third position.
Figure 11:
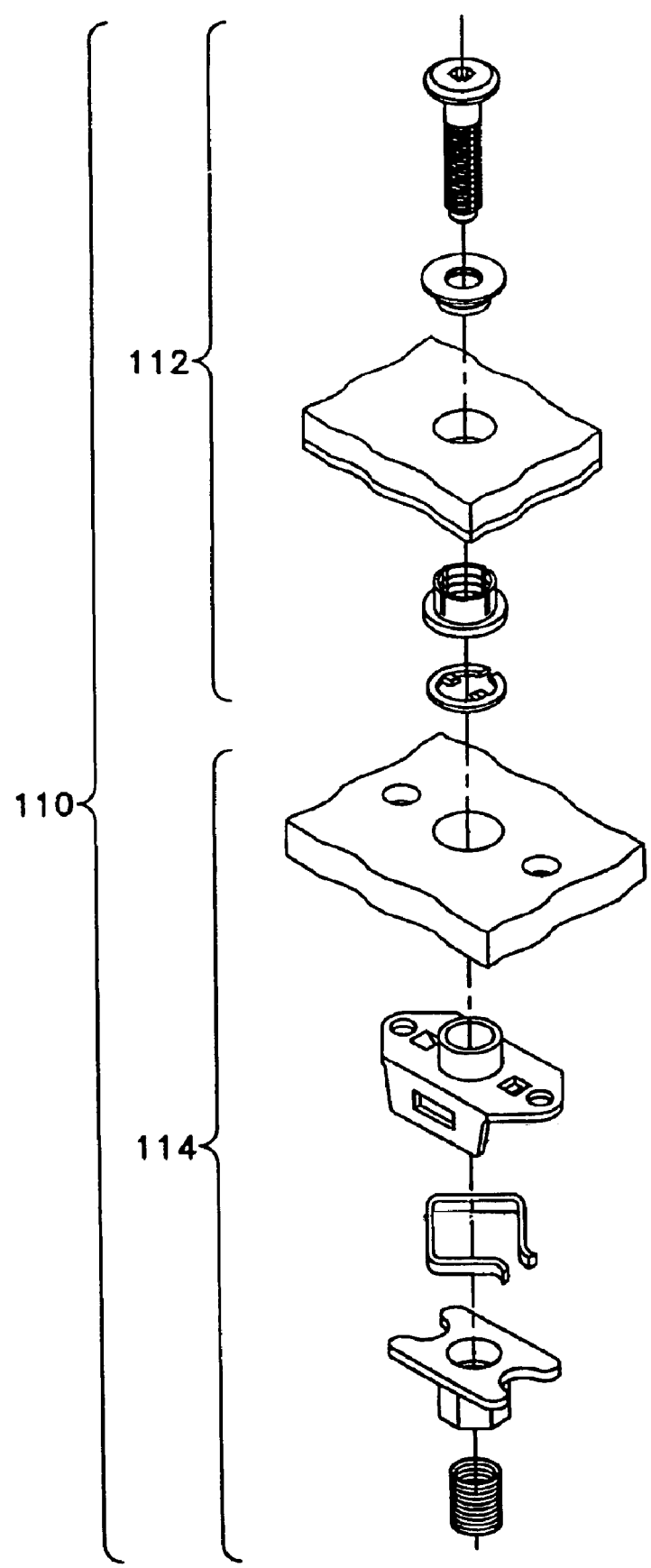
FIG. 11 is an exploded view of another embodiment of a fastening assembly according to the present disclosure.

FIGS. 8–10 show the three extended positions of stud 14. As shown in FIG. 8, tabs 40 of retaining ring 20 engages stud 14 at shoulder 60c in order to maintain stud 14 in an extended first captive position.

As shown in FIG. 9, retaining ring 20 is engaging with shoulder 60b of second lobe 58 in order to maintain stud 14 in a second extended captive position. As shown in FIG. 10, tabs 40 of retaining ring 20 engages shoulder 60a of stud 14 in order to maintain stud 14 in a third extended captive position.

Thus, one aspect of the present disclosure is the provision of a stud assembly that allows a stud to be positioned in at least three extended positions while remaining captive in the stud assembly.

Figure 13:
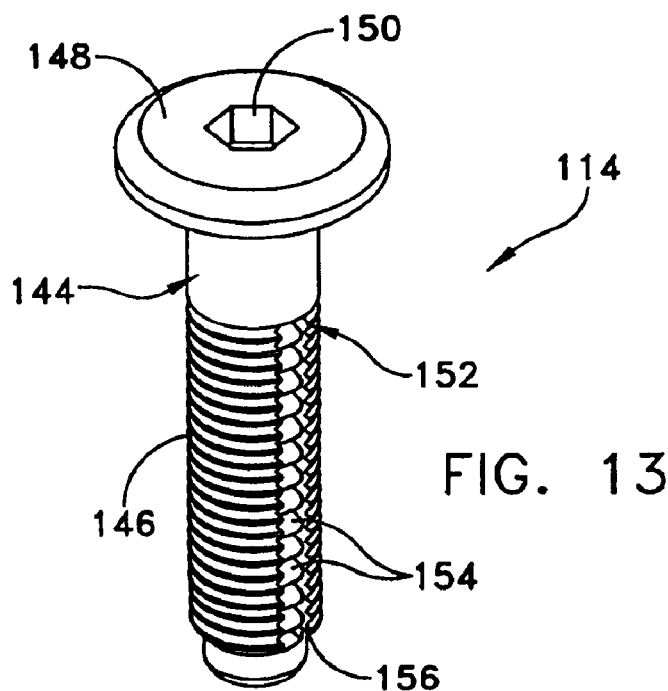
FIG. 13 is a perspective view of the stud shown as part of the stud assembly shown in FIG. 12.

Another embodiment of a fastening assembly according to the present disclosure is indicated generally at 110 in FIG. 13. Where elements are the same or substantially similar to those in the previous embodiment, they are preceded by the number "1." As shown, fastening assembly 110 includes a stud assembly indicated generally at 112 and a receptacle assembly indicated generally at 114.

Figure 12:
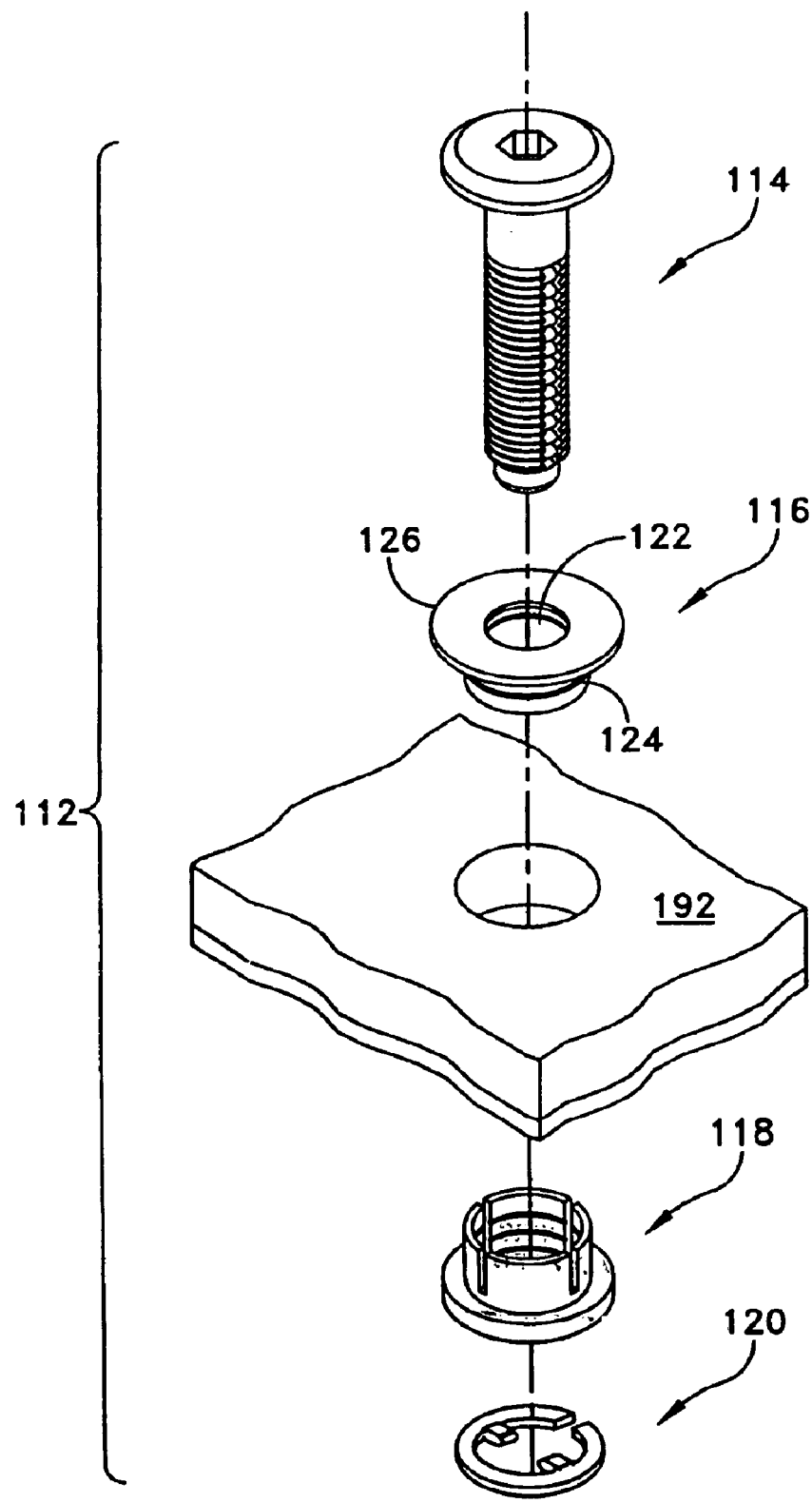
FIG. 12 is an exploded view of the stud assembly of the fastening assembly shown in FIG. 11.

Stud assembly 112 is illustrated in greater detail in FIG. 12. As shown, stud assembly 112 includes a stud 114, an upper sleeve 116, a lower sleeve 118, and a retaining ring 120 adapted to be received into lower sleeve 118. With the exception of stud 114, the remaining elements of stud assembly 112 are substantially the same as in the previous embodiment and their description will not be repeated herein.

Figure 14:
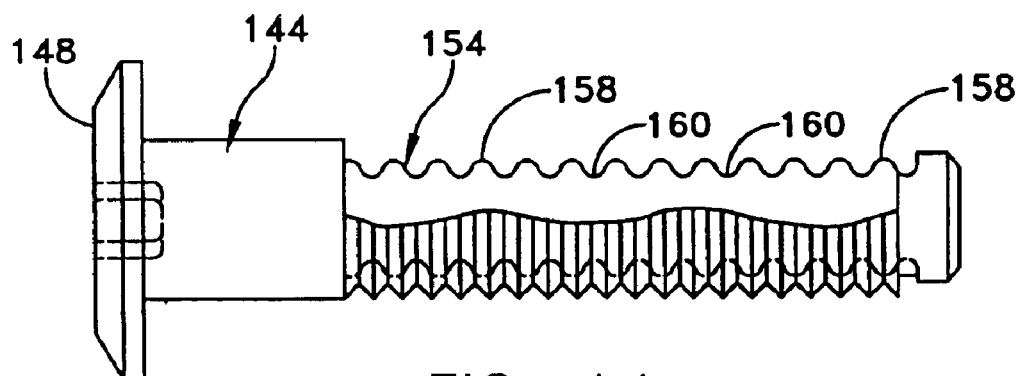
FIG. 14 is a side view of the stud shown in FIG. 13.
Figure 15:
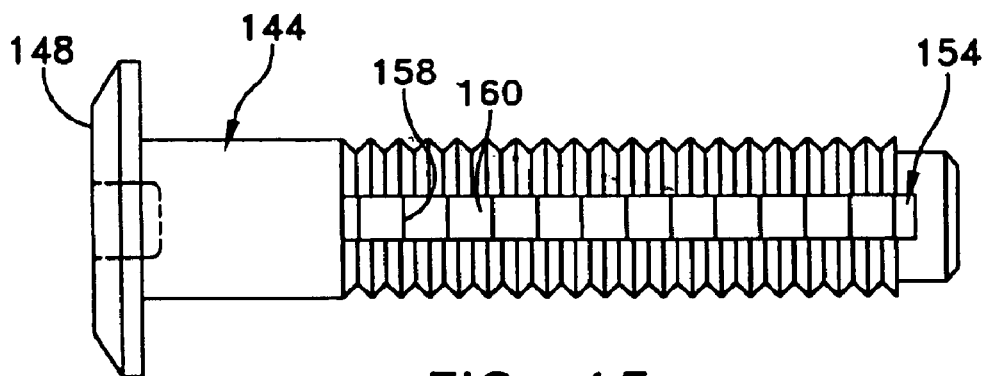
FIG. 15 is another side view of the stud shown in FIG. 13.

Stud 114 of stud assembly 112 is shown in greater detail in FIGS. 13–15. As shown, stud 114 is substantially symmetrical in construction, and includes a shank portion 144 having a threaded exterior surface 146 and a head 148 which includes a recess 150 for receiving a tool (not illustrated). Shank portion 144 includes two engagement sections 152 which are, in the present embodiment, channels. Engagement sections 152 may be recessed, as shown in the present embodiment, where engagement section 152 is defined by a channel. For ease of illustration, engagement sections 152 will be referred to hereinafter as channels.

Preferably, each channel 152 includes at least two engagement members 158 adapted to engage the inwardly protruding tabs 140 of retaining ring 120 when the stud and fastening assemblies are assembled together. In the present embodiment, channels 152 includes a plurality of engagement members 158 that protrude outwardly from an inner surface 154 of each channel 152, between which are disposed grooves 160. In the present embodiment, engagement members 158 are teeth having a generally arcuate shape. For ease of illustration, engagement members 158 will be referred to hereinafter as teeth.

As will be shown in greater detail below, tabs 140 of retaining ring 120 may be repositioned to engage each groove 160 in order to position stud 114 in a plurality of captive, engaged positions. Tabs 140 maybe moved over teeth 158 to a different engaged position by retracting or inserting stud 144 longitudinally in the fastening assembly, allowing tabs 140 to engage a different tooth 158.

Figure 16:
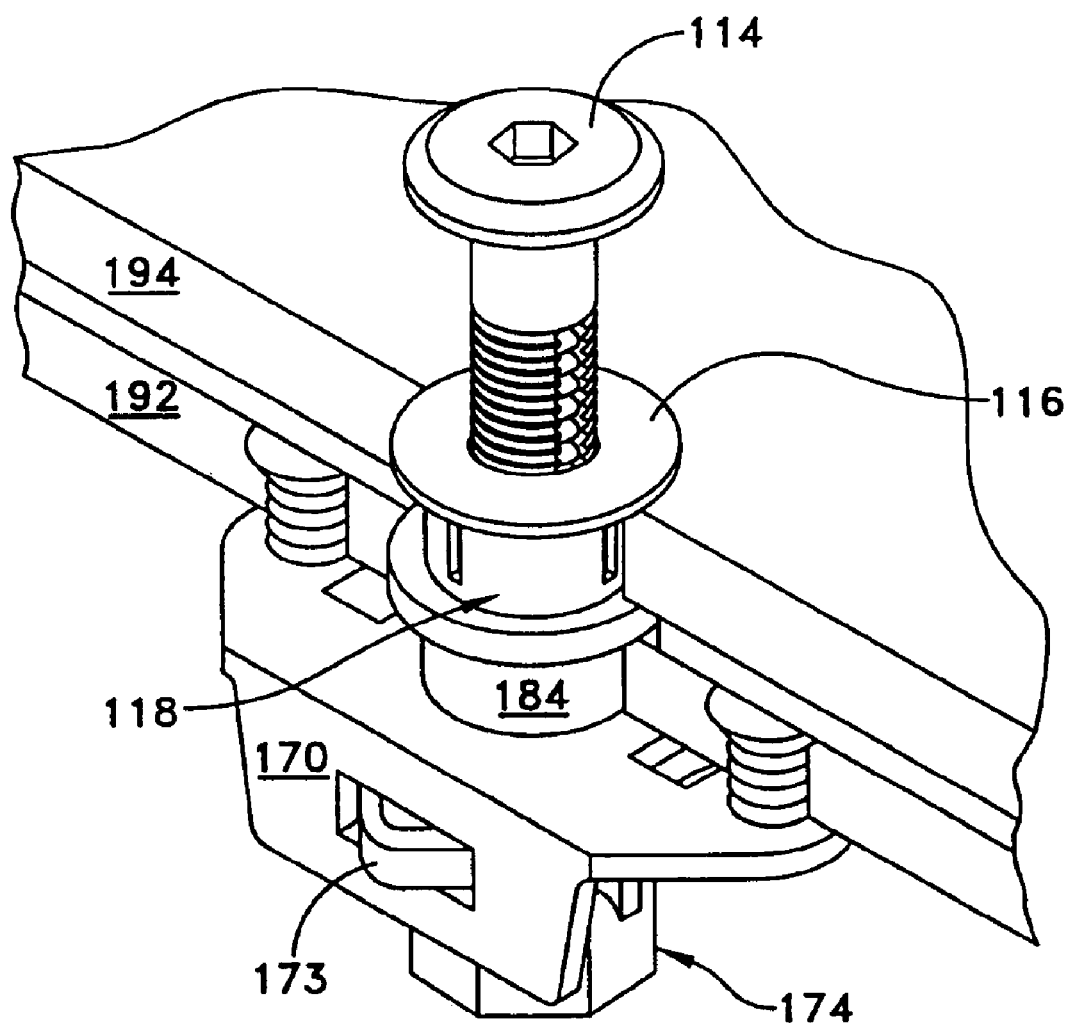
FIG. 16 is a perspective view of the fastening assembly of FIG. 11 in an assembled configuration.

As shown in FIG. 16, when attaching a cover to a panel, fastening assembly is assembled in a similar manner as in the previous embodiment.

Figure 17:
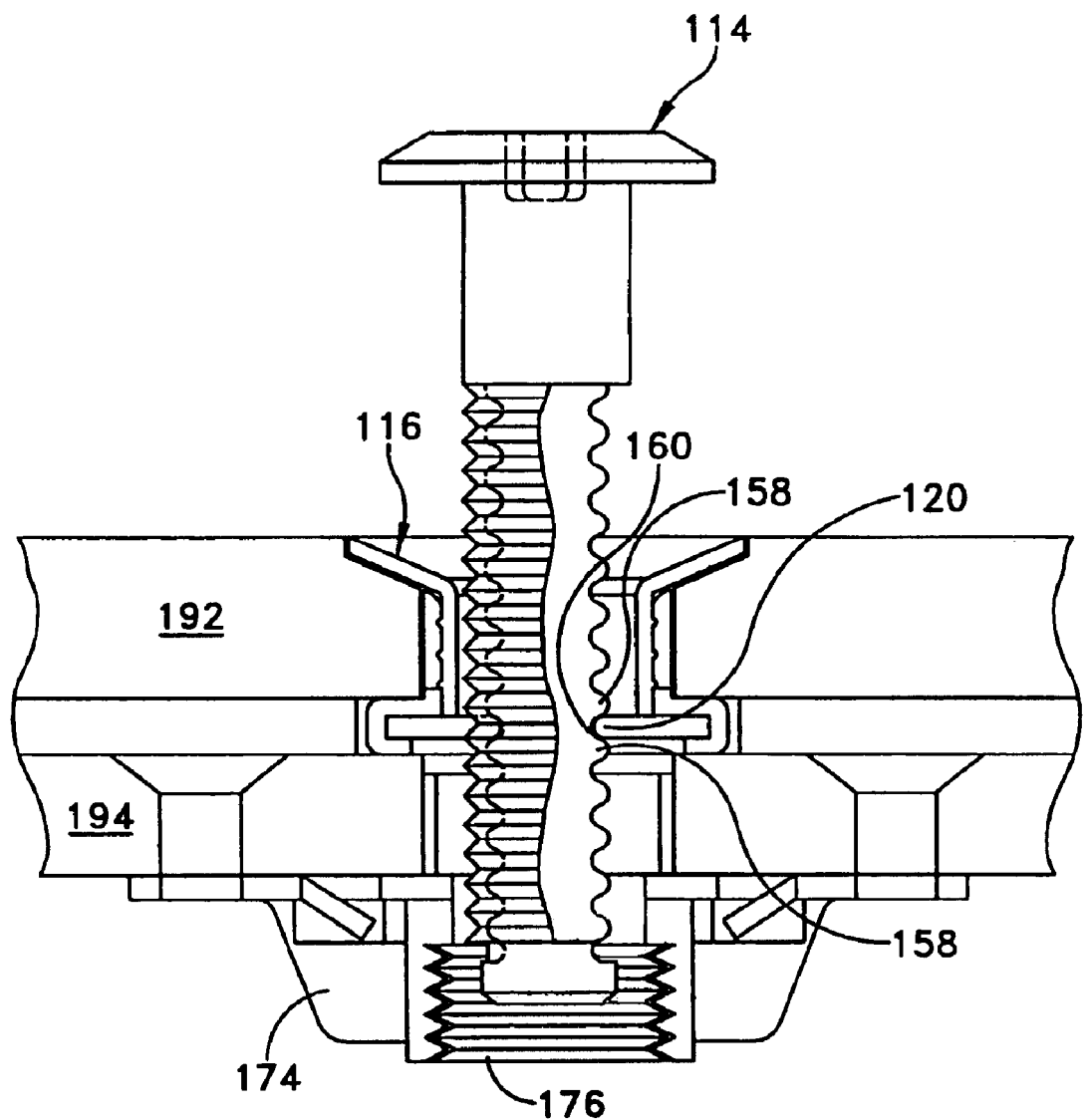
FIG. 17 is a sectional view of the fastening assembly of FIG. 16 with the stud in a first position.
Figure 18:
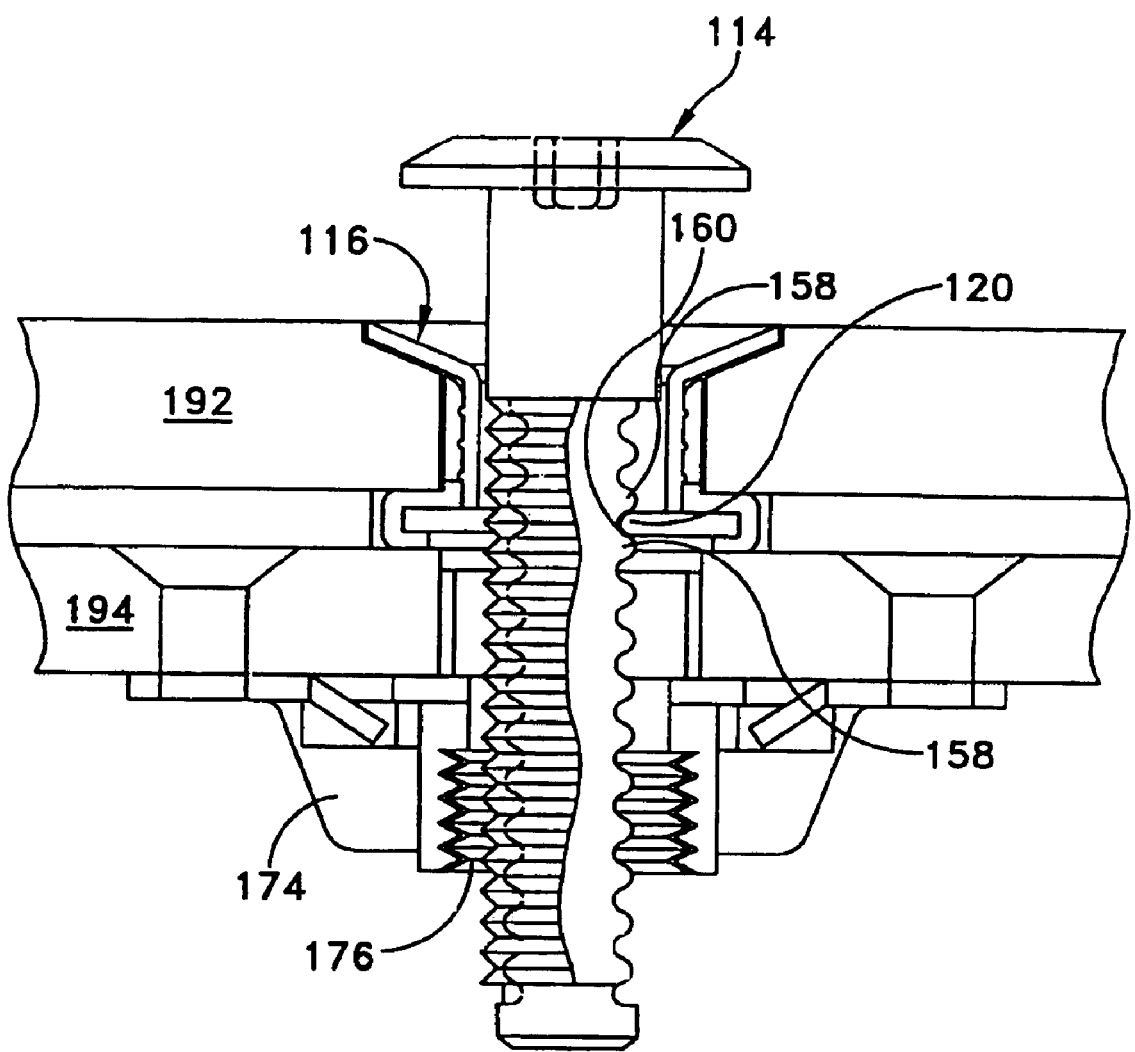
FIG. 18 is a schematic view of the fastening assembly of FIG. 17 with the stud in a second position.

As shown in FIGS. 17–18, when assembled rib 120 engages engaging portion 160 of stud 114 in order to position stud 114 in a plurality of predetermined, extended captive positions.

Thus, another aspect of the present disclosure is the provision of a receptacle assembly that allows a stud to be positioned in a plurality of predetermined, extended positions while remaining captive in the stud assembly.

Figure 19:
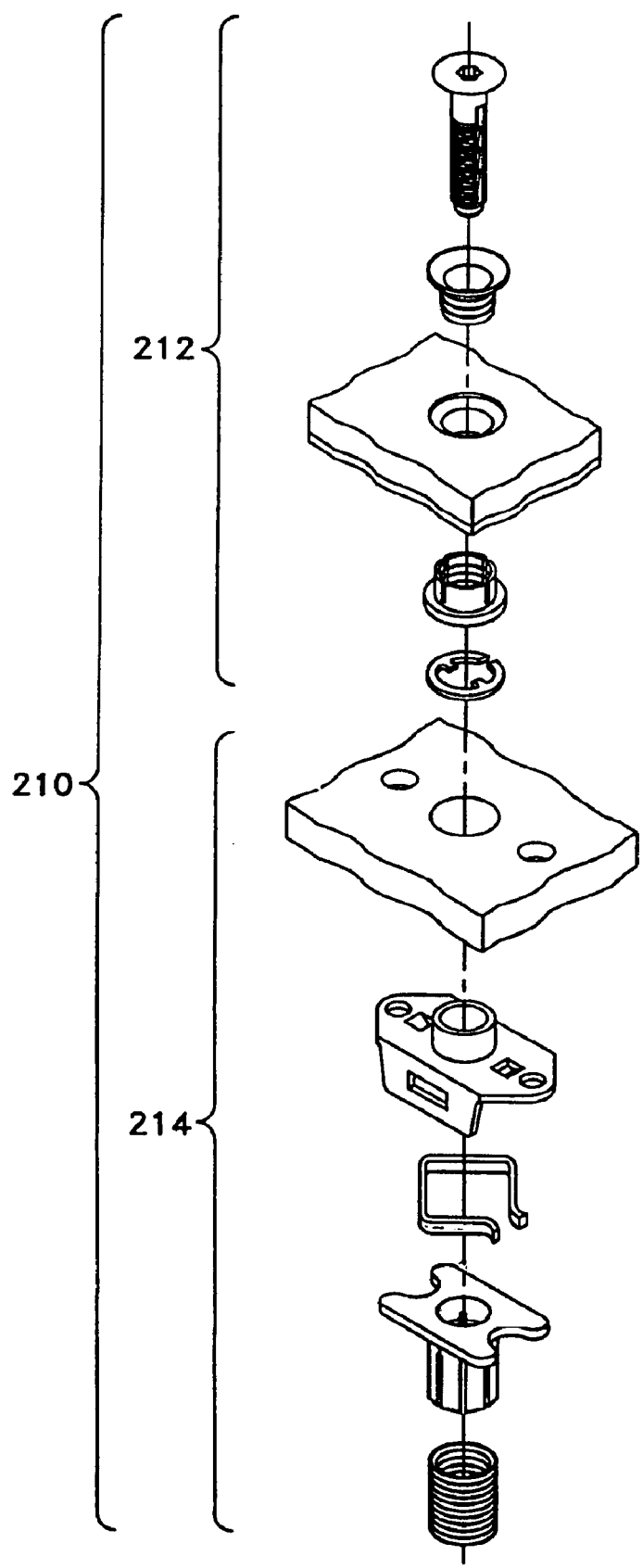
FIG. 19 is an exploded view of another embodiment of a fastening assembly according to the present disclosure, which includes another embodiment of a nut.

Another embodiment of a fastening assembly according to the present disclosure is indicated generally at 210 in FIG. 19. Where elements are similar to those in the previous embodiment are similar, they are preceded by the number "2." As shown, fastening assembly 210 includes a stud assembly indicated generally at 212 and a receptacle assembly indicated generally at 214.

Figure 20:
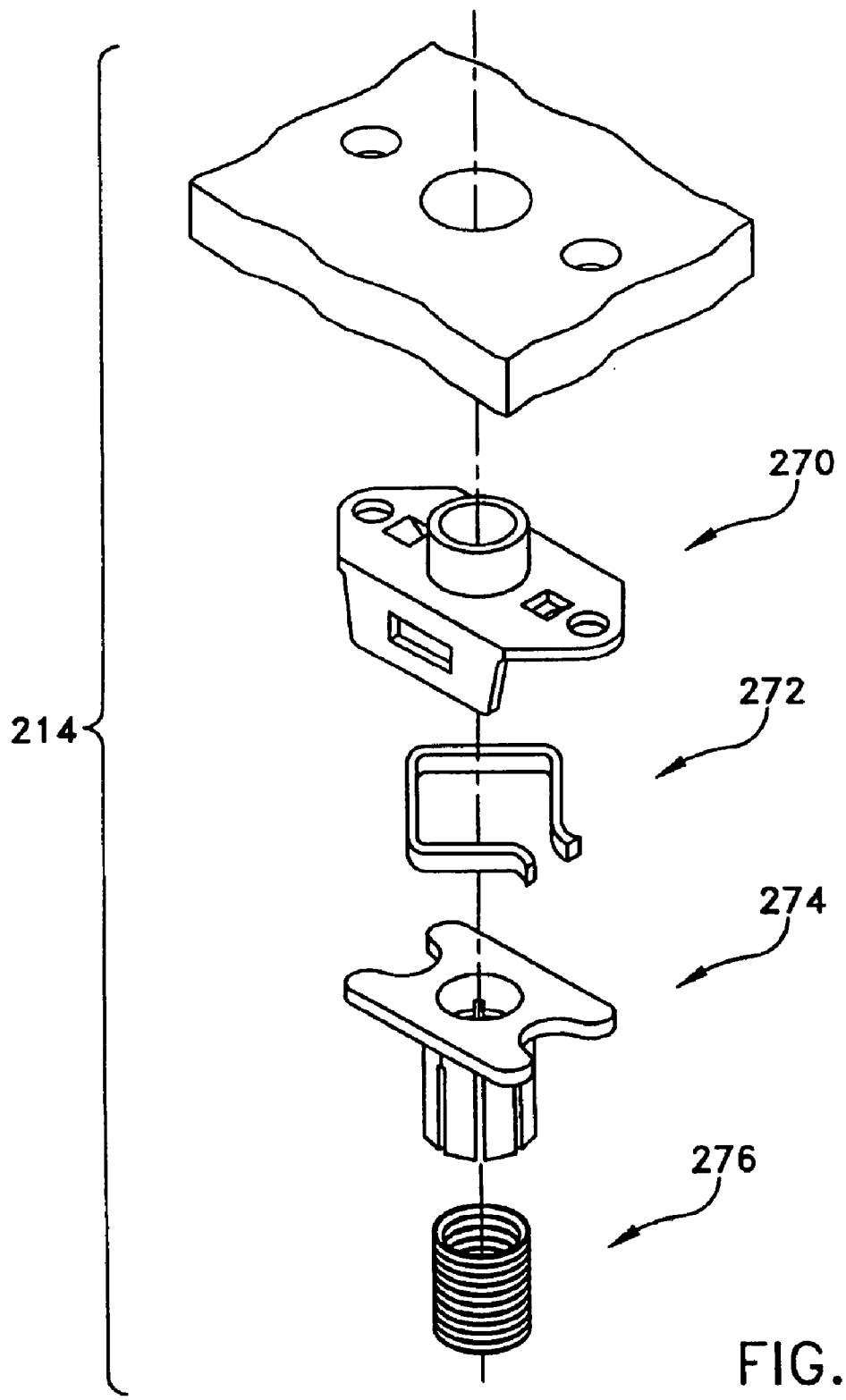
FIG. 20 is an exploded view of the receptacle assembly of the fastening assembly shown in FIG. 19.

Receptacle assembly 214 is illustrated in greater detail in FIG. 20. As shown, receptacle assembly 214 includes a bracket 270, a retaining clamp 272, a nut 274, and a spring or coil 276. With the exception of nut 274, the remaining elements of receptacle assembly 214 are the same as in the first and second embodiment and their description will not be repeated herein.

Figure 21:
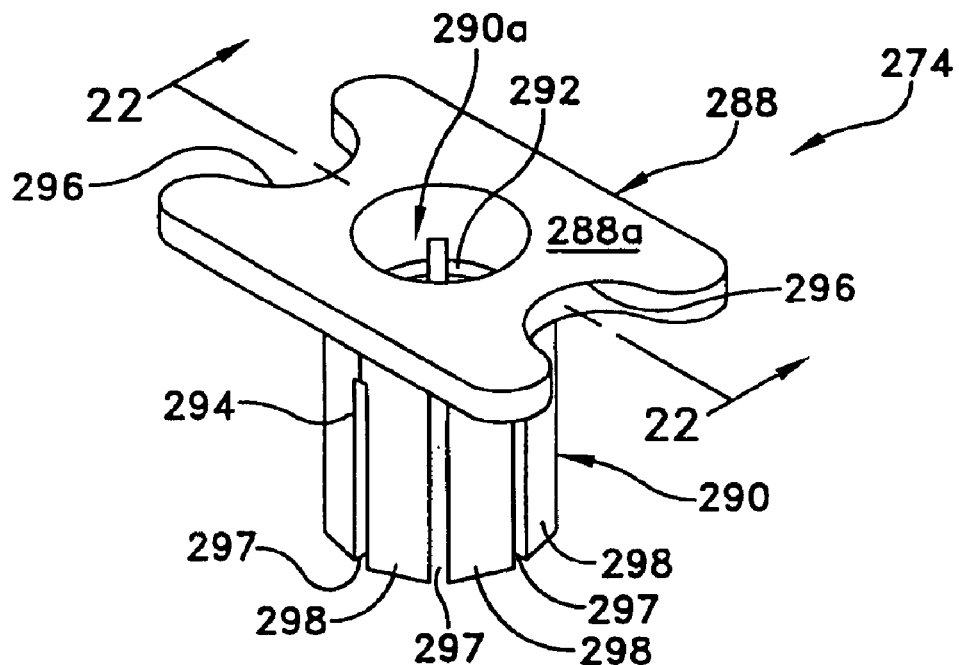
FIG. 21 is a perspective view of the nut shown as part of the receptacle assembly shown in FIG. 19.
Figure 22:
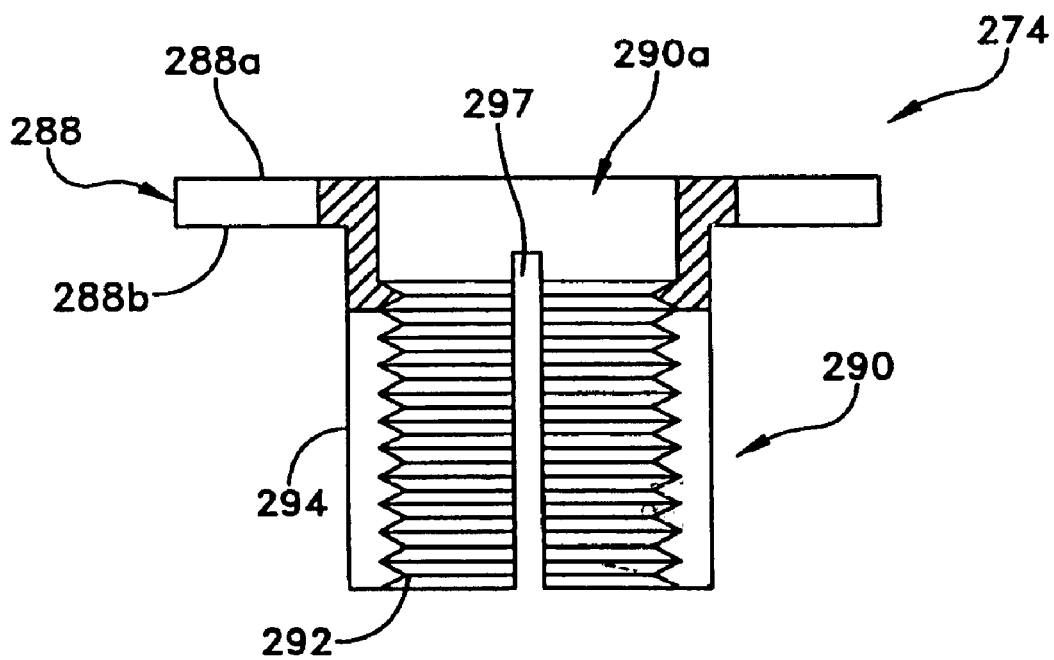
FIG. 22 is a sectional view of the nut shown in FIG. 19.

As shown in FIGS. 21 and 22, nut 274 includes a substantially planar upper portion 288 having an upper surface 288a and a lower surface 288bm from which a barrel 290 extends downwardly. Barrel 290 has an axially disposed bore 290a with a threaded interior surface 292 and an exterior surface 294 that may be substantially cylindrical, or may have a substantially hexagonal shape as shown. Upper portion 288 includes opposing arcuate channels 296 that correspond substantially with rivet bores 282 of bracket 270. Barrel 274 includes a plurality of spaced apart channels 297 defining flanges 298. Channels 297 may extend all the way to upper portion 288 but, in the present embodiment, they terminate adjacent to and spaced apart from the upper portion. Preferably, nut 274 may be formed from any material having a memory, such as a shape memory alloy.

Figure 23:
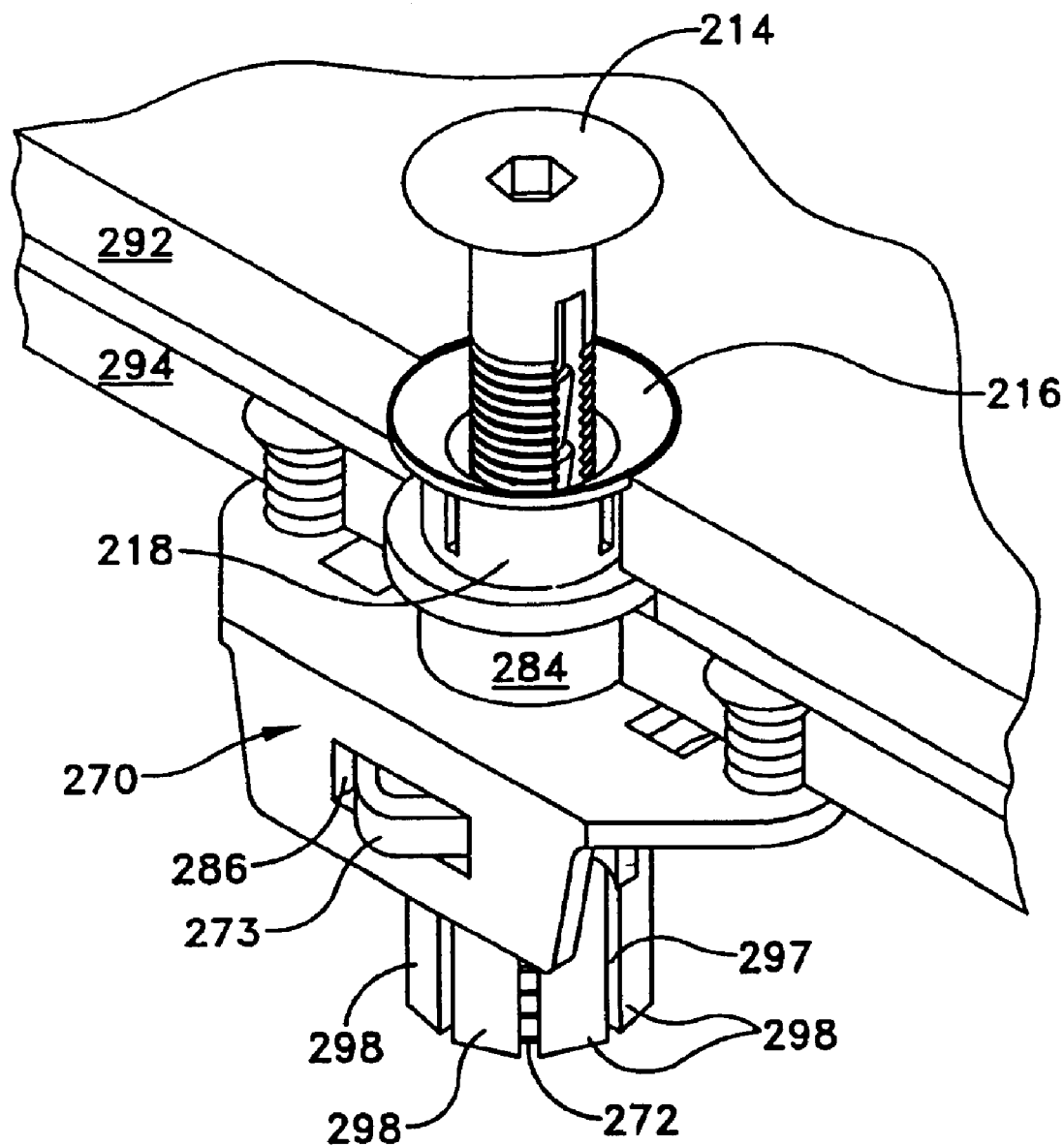
FIG. 23 is a perspective view of the fastening assembly of FIG. 19 in an assembled configuration.

When assembled, as shown in FIG. 23, nut 274 is inserted into bracket 270, retaining clamp 272 is positioned around barrel 290, and engaging corners 273 of the retaining clamp 270 are engaged in slots 286 of bracket 270. Spring 276 is threaded into interior surface 292 of barrel 290.

Figure 24:
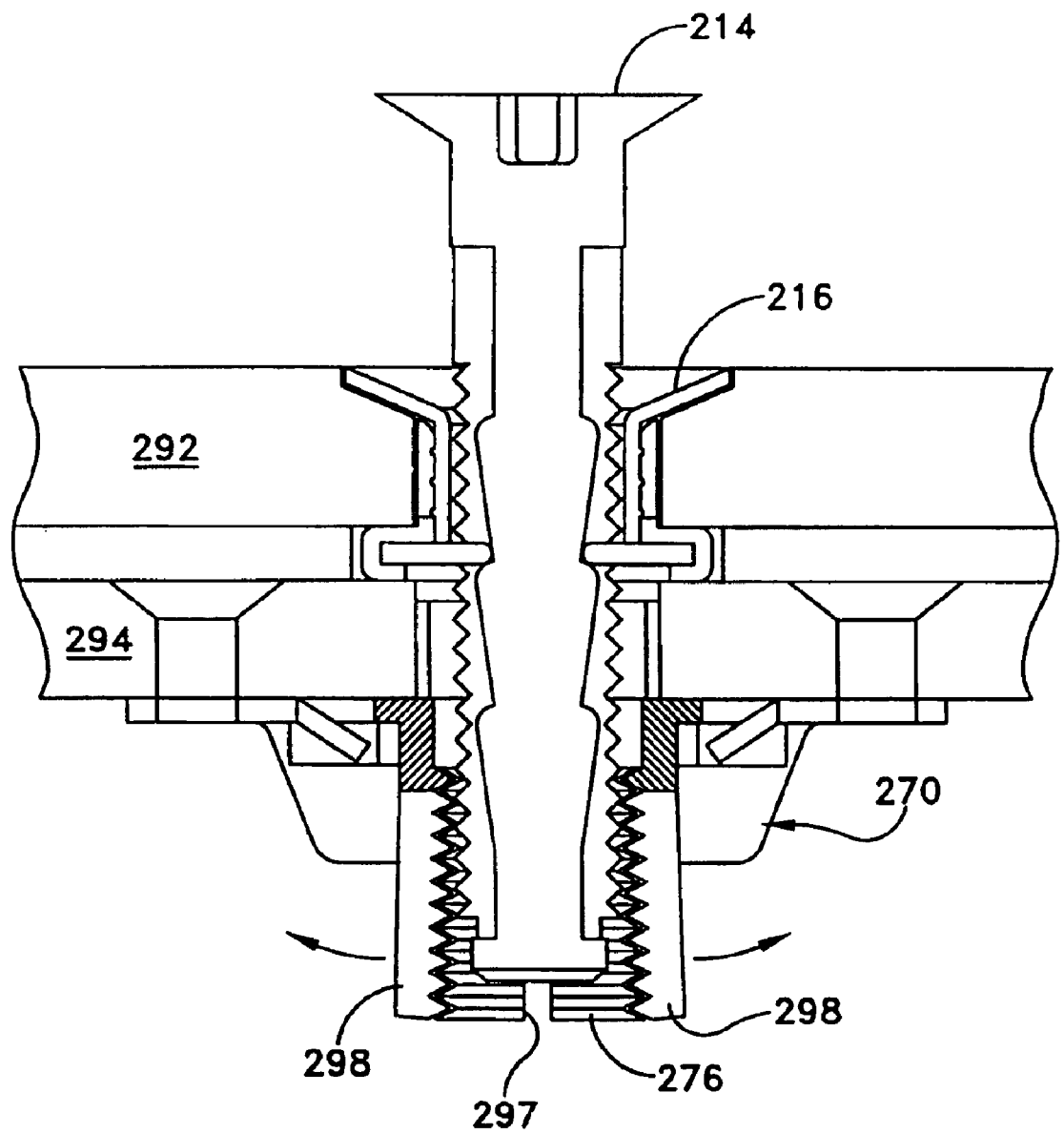
FIG. 24 is a sectional view showing the operation of the fastening assembly of FIG. 19 as the stud is inserted in to the nut.
Figure 25:
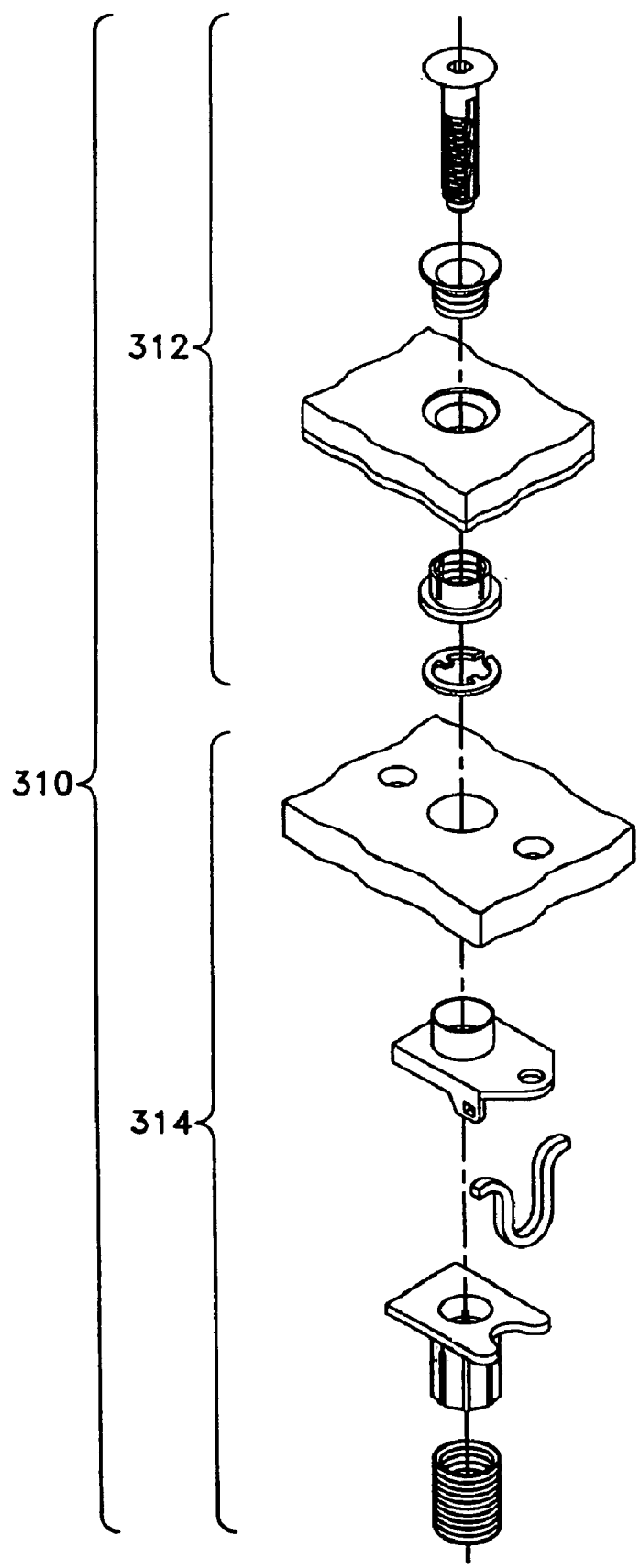
FIG. 25 is an exploded view of another embodiment of a fastening assembly according to the present disclosure which is particularly adapted for smaller dimensions.

As shown in FIG. 24, the force exerted when stud 214 is driven into barrel 290 causes coil 272 to expand, which in turn causes flanges 298 to extend outwardly as shown by the arrows. In between turns of the tool, or when stud 214 is completely inserted into barrel 290, the force on spring 272 is interrupted or stopped completely, and flanges 298 spring back to their original position because they are formed from a material having a memory. As a result, the distribution of force is substantially evenly distributed along barrel 290 instead of being concentrated at, for example, the lower end of the barrel. The present nut may be used with either of the previously described stud and/or fastening assemblies.

Thus, another aspect of the present disclosure is the provision of a receptacle assembly that provides even distribution of stress along the barrel of the receptacle assembly.

Figure 26:
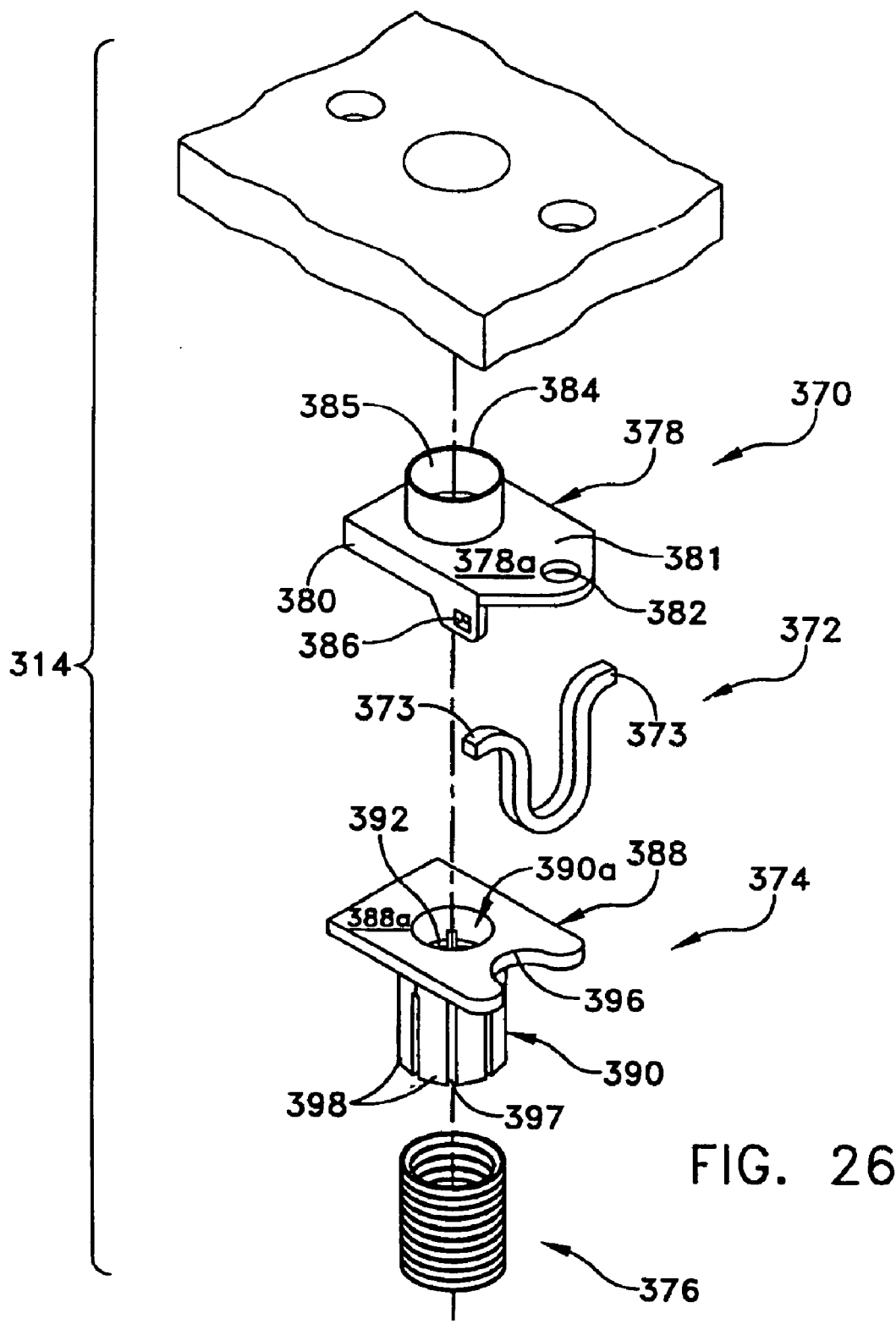
FIG. 26 is an exploded view of the receptacle assembly of the fastening assembly shown in FIG. 25.

Another embodiment of a fastening assembly according to the present disclosure is indicated generally at 310 in FIG. 26. Where elements are similar to those in the previous embodiment are similar, they are preceded by the number "3." As shown, fastening assembly 310 includes a stud assembly indicated generally at 312 and a receptacle assembly indicated generally at 314.

Figure 27:
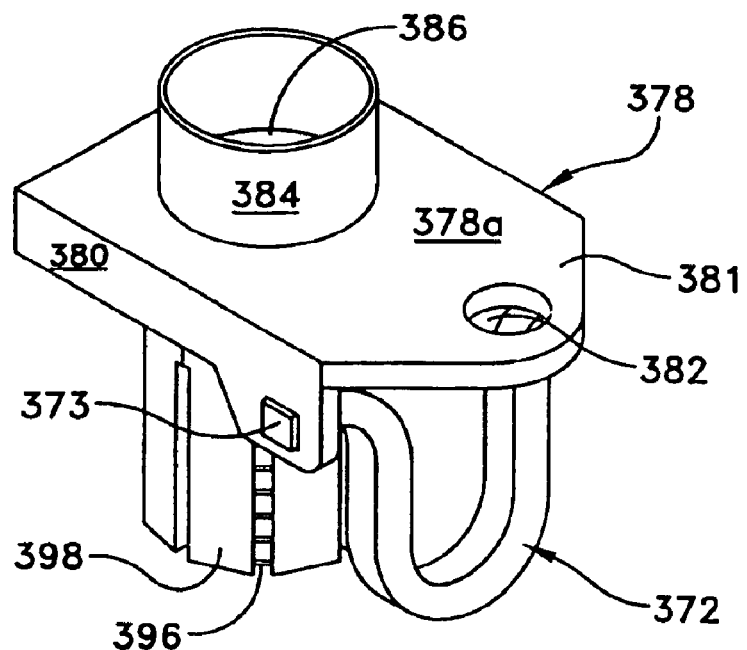
FIG. 27 is a top perspective view of the receptacle assembly shown in FIG. 26 in an assembled configuration.
Figure 28:
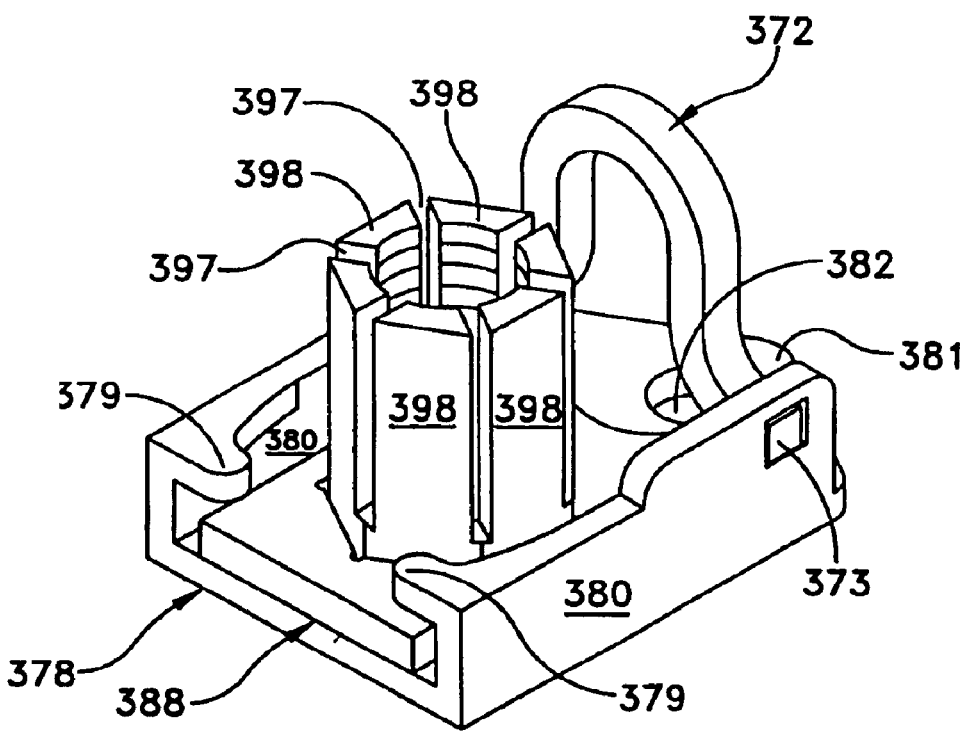
FIG. 28 is a bottom perspective view of the receptacle assembly shown in FIG. 26 in an assembled configuration.

Receptacle assembly 314 is illustrated in greater detail in FIGS. 27–28. As shown, receptacle assembly 314 includes a bracket 370, a retaining clamp 372, a nut 374, and a spring or coil 376. As shown, bracket 370 includes a substantially planar upper portion 378 from which two opposed sidewalls 380 extend downwardly. The substantially planar upper portion 378 includes a projection 381 extending outwardly from one end. Projection 381 includes a rivet bore 382 for securing bracket 370 to, for example, a panel. Extending upwardly from upper portion 378 is a collar 384 which defines a bracket opening 385 for receiving stud 314 therethrough. Each sidewall 380 includes at least one slot 386 for receiving retaining clamp 72 as will be described in greater detail below. As best seen in FIG. 28, two opposed inwardly projecting engagement tabs 379 extend from each sidewall 380 opposite projection 381 and parallel to upper portion 378.

In the present embodiment, retaining clamp 372 preferably has a substantially U-shape with outwardly extending opposing upper tips 373. Tips 373 act as engagement members for engaging slots 386 of bracket 370.

Nut 374 includes a substantially planar upper portion 388 having an upper surface 388a and a lower surface 388b, from which a barrel 390 extends downwardly. Barrel 390 includes an axially disposed bore 390a having a threaded interior surface 392 and an exterior surface 394 that may be substantially cylindrical, or may have a substantially hexagonal shape as shown. Upper portion 388 includes an arcuate channel 396 corresponding substantially with a rivet bore 382 of bracket 370. Barrel 390 includes a plurality of spaced apart channels 397 defining flanges 398. As in the previous embodiment, nut 374 preferably may be formed from any material having a memory, such as a shape memory alloy.

To assemble receptacle assembly 314, as shown in FIGS. 27–28, nut 374 is slidably inserted into bracket 370 between opposing sidewalls 380 until nut 374 abuts engagement tabs 379. Tips 373 of retaining clamp 372 may then be engaged with slots 386. As shown, when assembled, opposing sidewalls 380 limit lateral movement of nut 374, engagement tabs 379 limit longitudinal movement of nut 373 in one direction, and retaining clamp 372 limits longitudinal movement of nut 374 in the opposite direction. Coil 376 then may be threaded into interior surface 392 of barrel 390.

Figure 29:
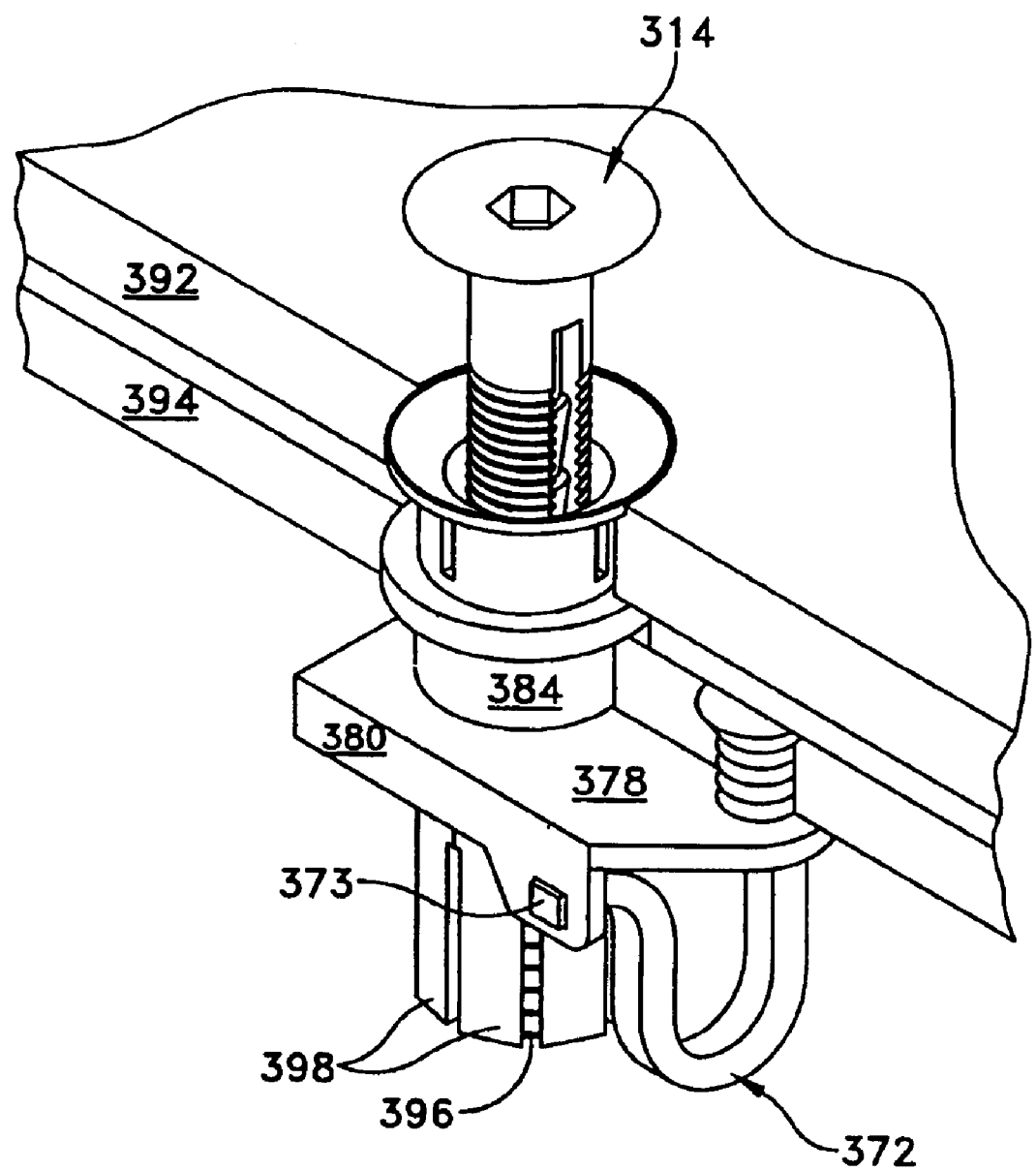
FIG. 29 is a perspective view showing the fastening assembly of FIG. 25 in an assembled configuration.

FIG. 29 illustrates a perspective view of stud assembly 312 and receptacle assembly 314 holding a cover 392 to a panel 394.

Figure 30:
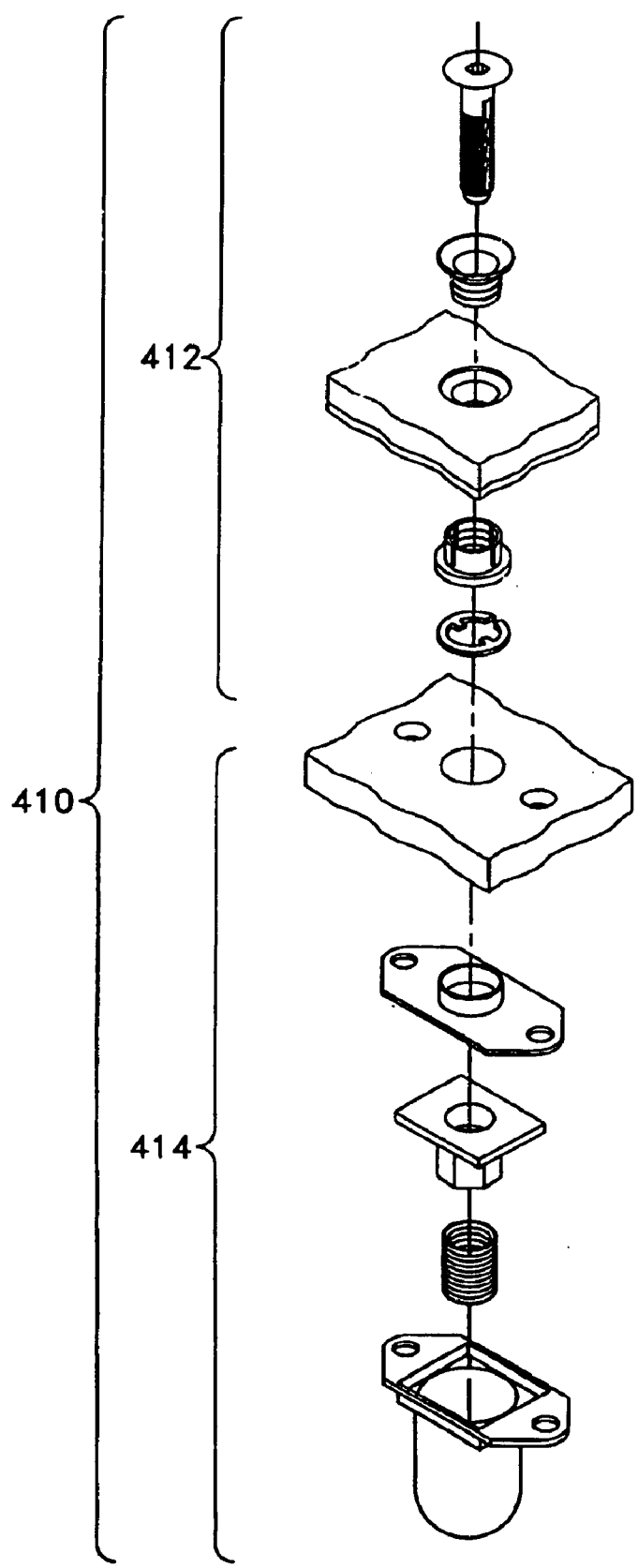
FIG. 30 is an exploded view of another embodiment of a fastening assembly according to the present disclosure which includes a pressure seal.

Another embodiment of a fastening assembly according to the present disclosure is indicated generally at 410 in FIG. 30. Where elements are similar to those in the previous embodiment are similar, they are preceded by the number "4." As shown, fastening assembly 410 includes a stud assembly indicated generally at 412 and a receptacle assembly indicated generally at 414.

Figure 31:
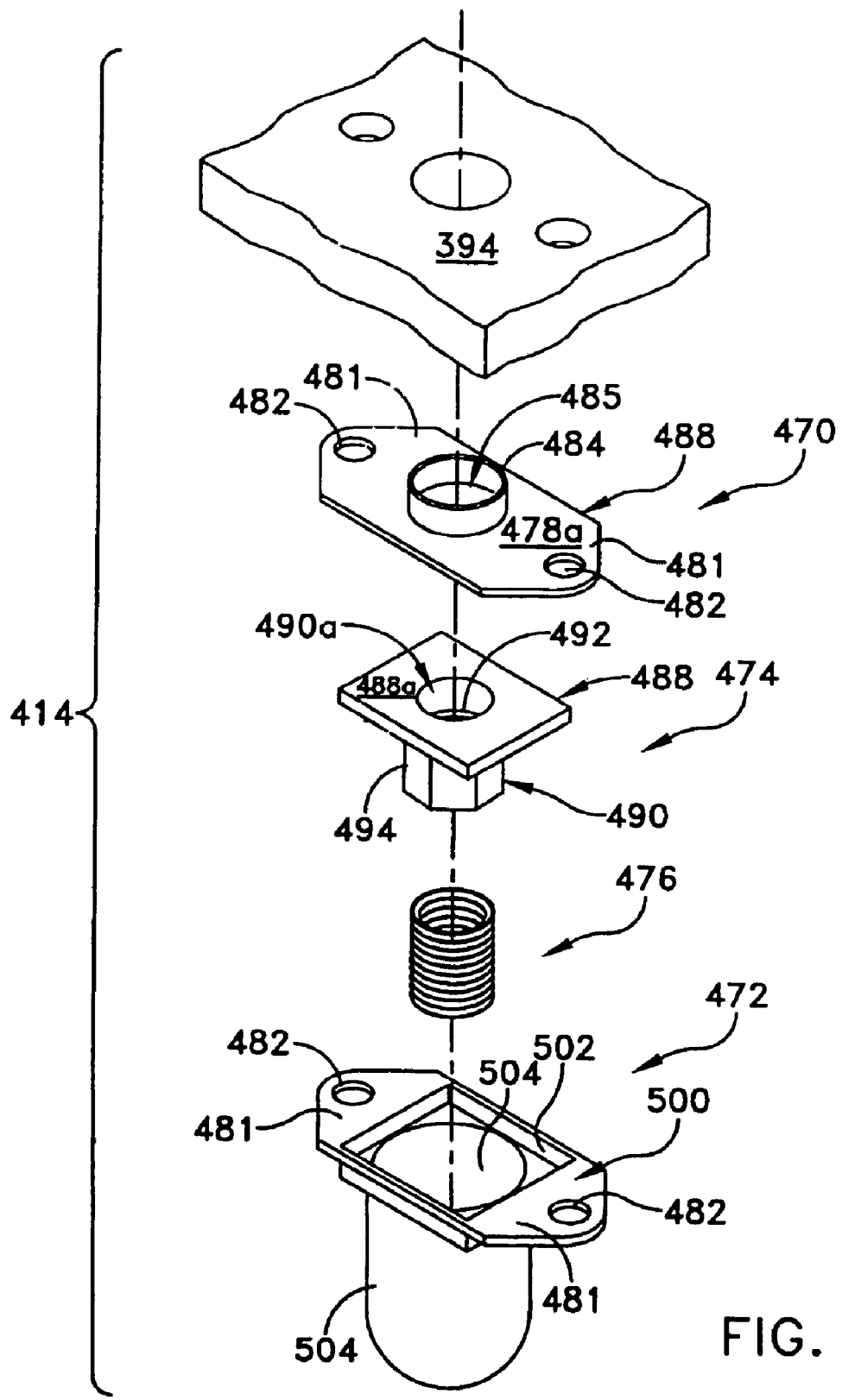
FIG. 31 is an exploded view of the receptacle assembly of the fastening assembly shown in FIG. 30.
Figure 32:
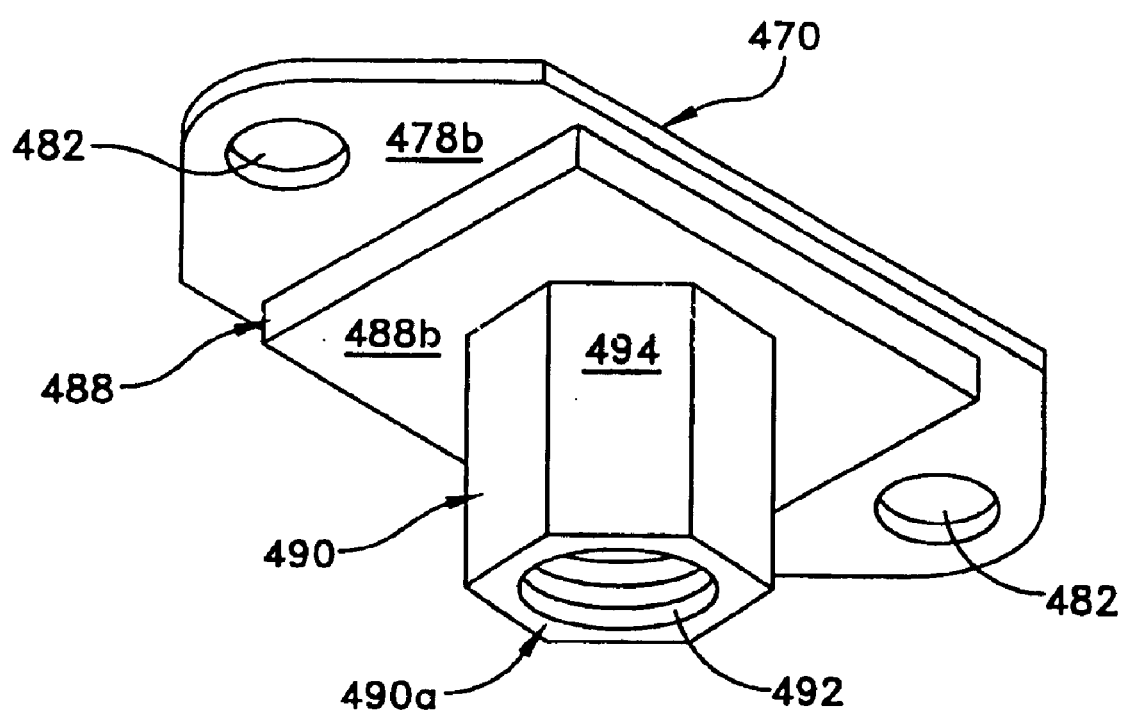
FIG. 32 is a perspective view of the bracket and nut of the fastening assembly shown FIG. 31.

Receptacle assembly 414 is illustrated in greater detail in FIGS. 31–32. As shown, receptacle assembly 414 includes a bracket 470, a seal unit 472, a nut 474, and a coil 476. As shown, bracket 470 includes a substantially planar upper portion 478 having an upper surface 478a and a lower surface 478b, and including opposed projections 481 extending outwardly therefrom. Each projection 481 includes a rivet bore 482 for securing bracket 470 to, for example, a panel. Extending upwardly from upper portion 478 is a collar 484 which defines a bracket opening 485 for receiving stud 414 therethrough.

Nut 474 includes a substantially planar upper portion 486 from which a barrel 490 extends downwardly. Barrel 490 includes an axial bore 490a having a threaded interior surface 492 and an exterior surface 494 that may be substantially cylindrical, or may have a substantially hexagonal shape as shown.

Seal unit 472 includes a substantially square planar upper portion 500 with projections 481a that correspond with projections 481 of bracket 470, and rivet bores 482a that correspond substantially with rivet bores 482 of bracket 470. Seal unit also includes a substantially square recessed region 502, from which a closed cap 504 extends downwardly.

Figure 33:
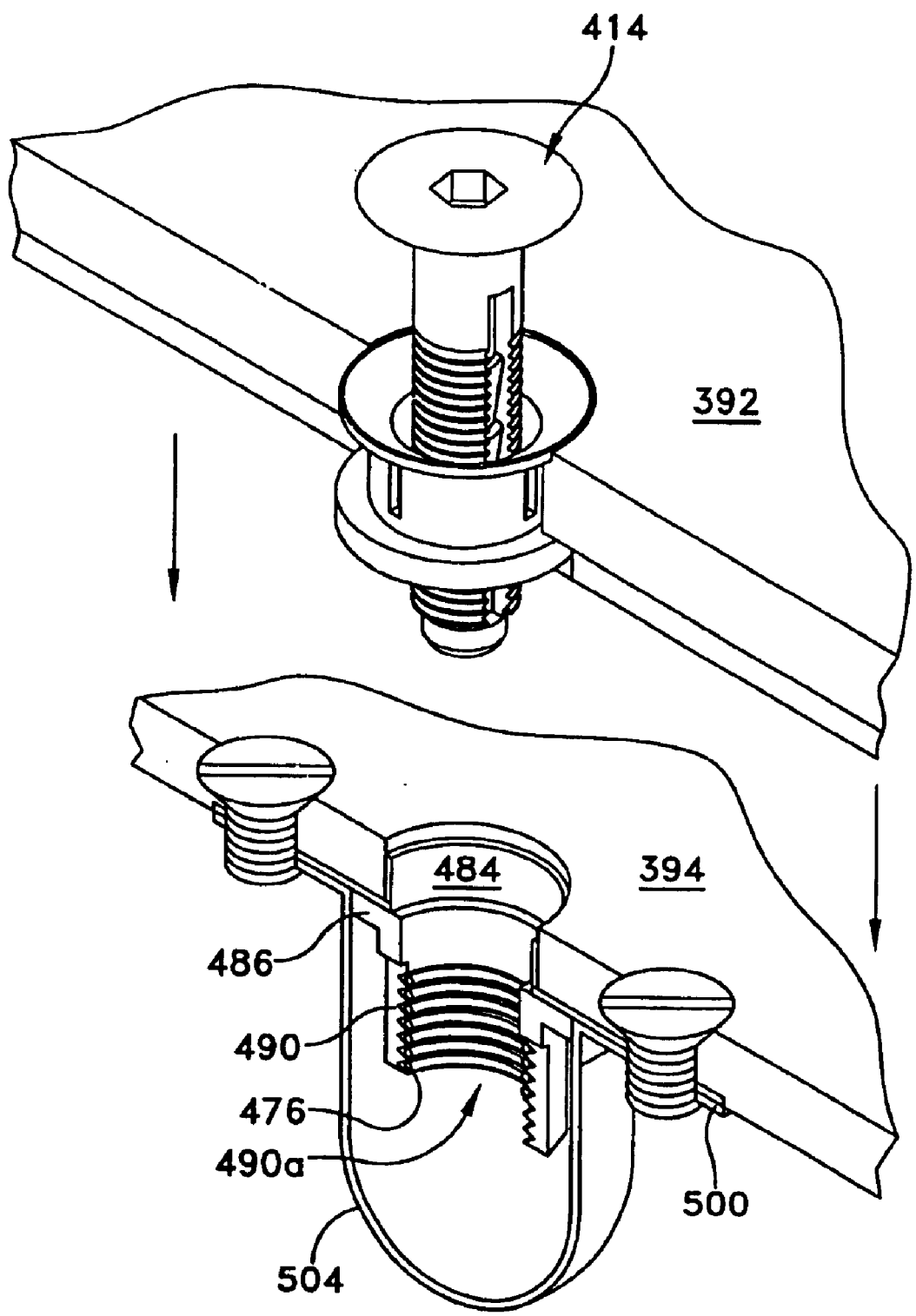
FIG. 33 is a perspective view of the stud and receptacle assemblies shown in FIG. 30, each attached to a panel.

When assembled, as shown in FIGS. 32 and 33, bracket 470 and nut 474 are positioned adjacent one another, and upper portion 486 of nut 470 is positioned in recessed region 502 of seal unit 422. Coil 476 may then be threaded into interior surface 492 of bore 490a.

Thus, one aspect of the present disclosure is the provision of a receptacle assembly that includes a vacuum seal. This allows the receptacle assembly to be used in areas where pressure differentials occur, such as frequently occurs in aircraft.

When used as structural components, the foregoing fastening assemblies may be formed from materials capable of withstanding high stress, such as steel. Individual components may be formed from other materials such as structural plastics, composites, shape memory alloys, and the like. In a preferred embodiment, the nut may be formed from a polyamide available under the product name VESPEL®. In other preferred embodiments, structural plastics such as fiber reinforced polymers also may be used for certain components to reduce the weight of the assembly. One type of material is a fiberglass reinforced polymer that includes about 30 percent to about 60 percent, by weight, of fiberglass. This concentration may vary, of course, depending upon the matrix polymer, the source of the material, the type of fiber, etc.

As mentioned previously, the bracket of each of the foregoing receptacle assemblies may be unitary or may be assembled from separate components. In addition, the length of the collars may vary in order to accommodate different panel thicknesses. When the foregoing brackets are unitary, they are typically formed by die casting, which necessitates the formation of a different cast for each desired bracket, and each collar length. One way around this problem is to form a single cast for each type of bracket, using the longest collar length, and achieving shorter collar lengths by grinding off part of the collar. Each of the foregoing is time consuming and expensive.

One method of reducing manufacturing costs and tailoring the length of the collar according to specific dimensions is to form the bracket as two separate components. One example of such a bracket 570 (which similar in construction to the bracket shown in FIGS. 25–30), is illustrated in FIGS. 34–38. Bracket 570 includes a bracket portion 570a and a removable collar 584 that mates or is friction fitted with bracket portion 570a.

Figure 34:
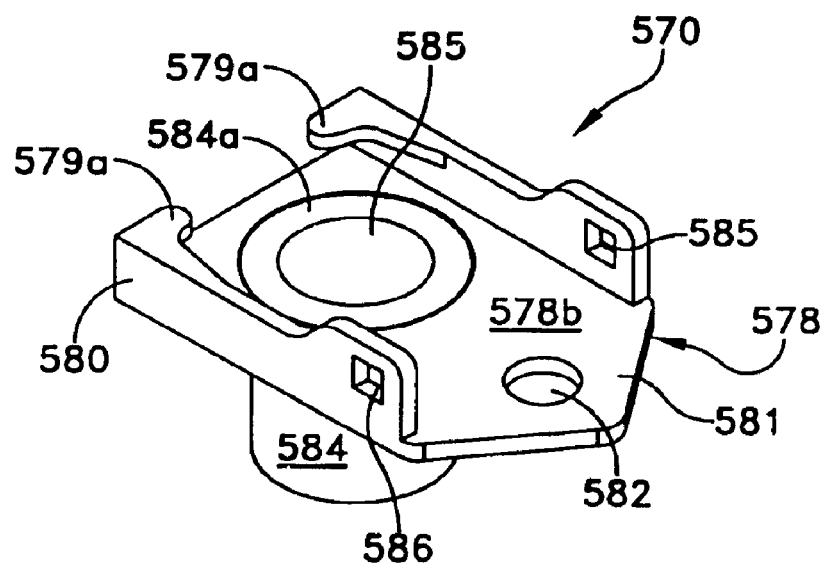
FIG. 34 is a perspective view of another embodiment of a bracket.
Figure 35:
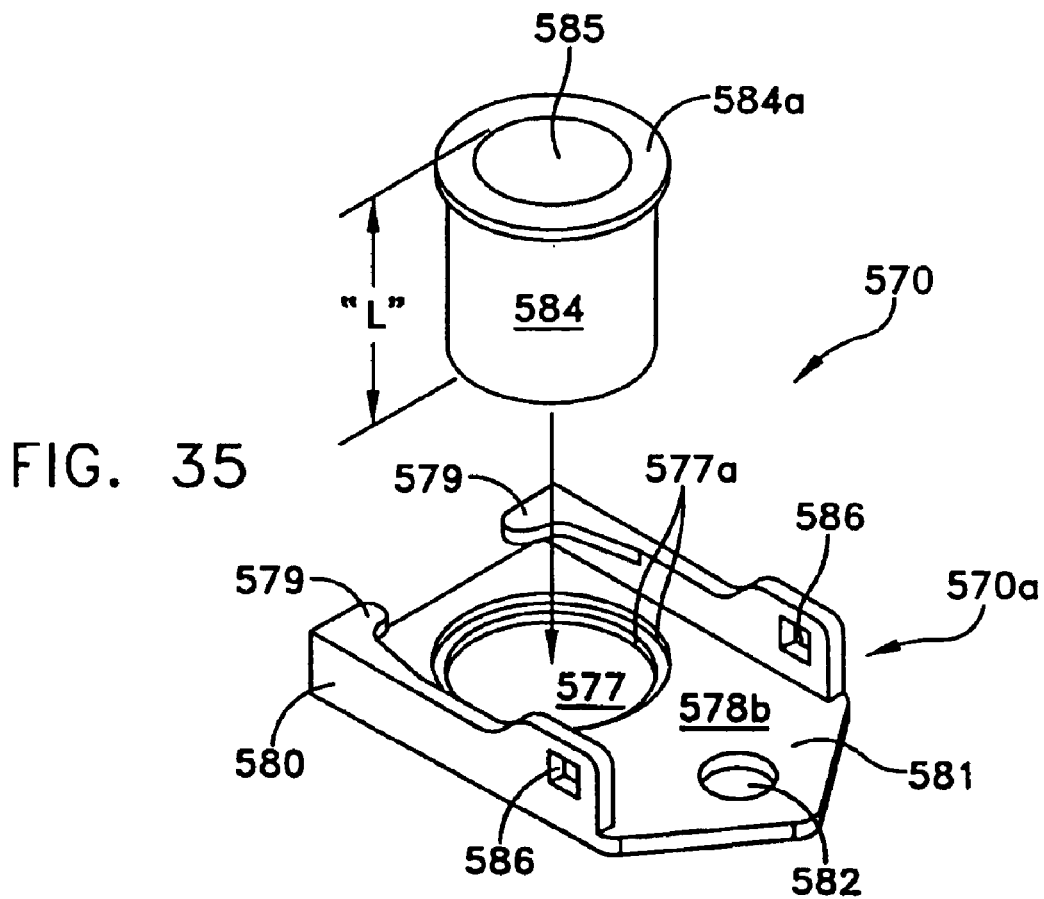
FIG. 35 is an exploded view of the bracket of FIG. 34.

FIG. 34 shows bracket portion 570a and a collar 584 in assembled configuration. As shown in exploded view in FIG. 35, collar 584 is substantially cylindrical, and includes an inner bore 585 for receiving a stud therethrough, as in previous embodiments. Collar 584 also includes a circumferential flange 584a extending radially outwardly at one end. Collar 584 has a length "L" that may vary depending upon the thickness of the panel to which the receptacle assembly will be attached. In general, collar 584 may vary in length from about 0.010 inch to about 0.20 inch, more preferably about 0.025 inch to about 0.125 inch. Bracket 570a may be used with any collar 584, regardless of its' length "L." As a result, by manufacturing different collars with different lengths "L," it is possible to eliminate manufacturing steps otherwise required to grind the collar to a desired length as may be required when a unitary bracket is manufactured using other methods.

Figure 36:
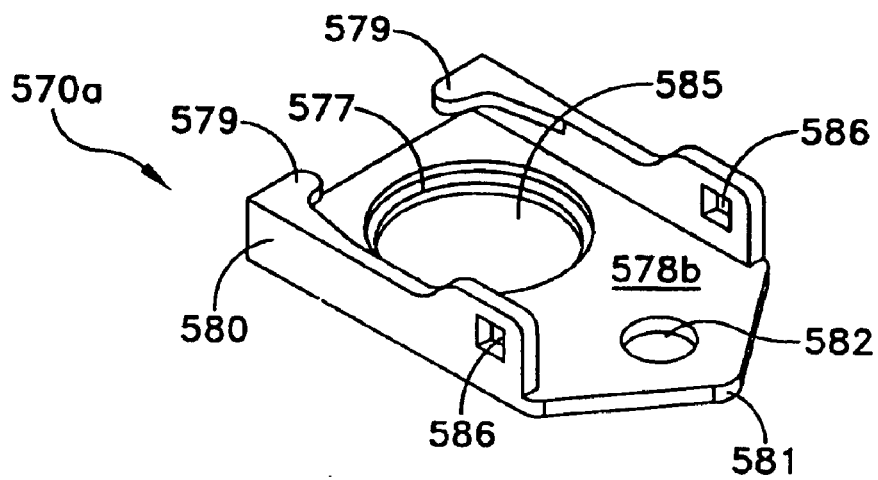
FIG. 36 is a bottom perspective view of the bracket of FIG. 34.
Figure 37:
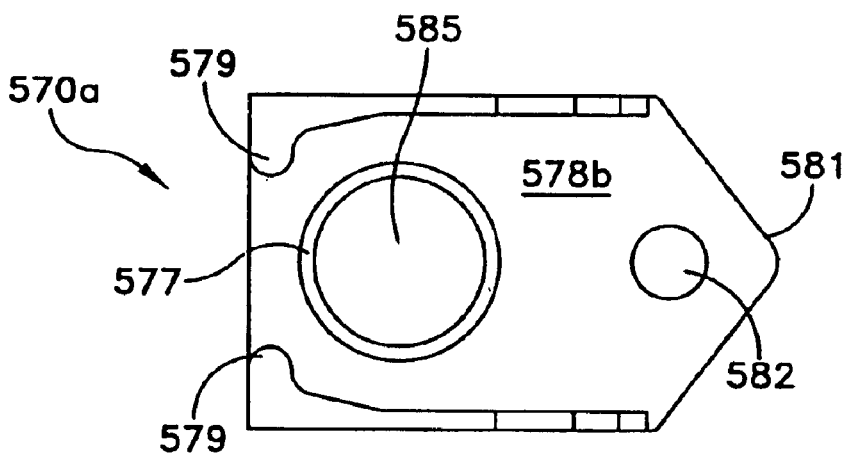
FIG. 37 is a bottom perspective view of the bracket of FIG. 34.
Figure 38:
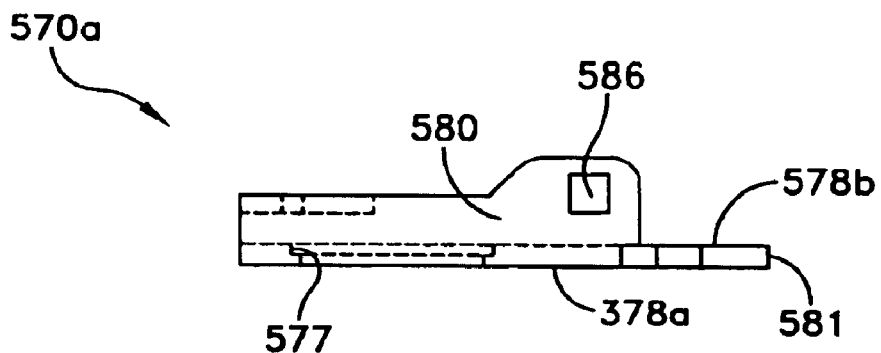
FIG. 38 is a bottom perspective view of the bracket of FIG. 34.
Figure 40:
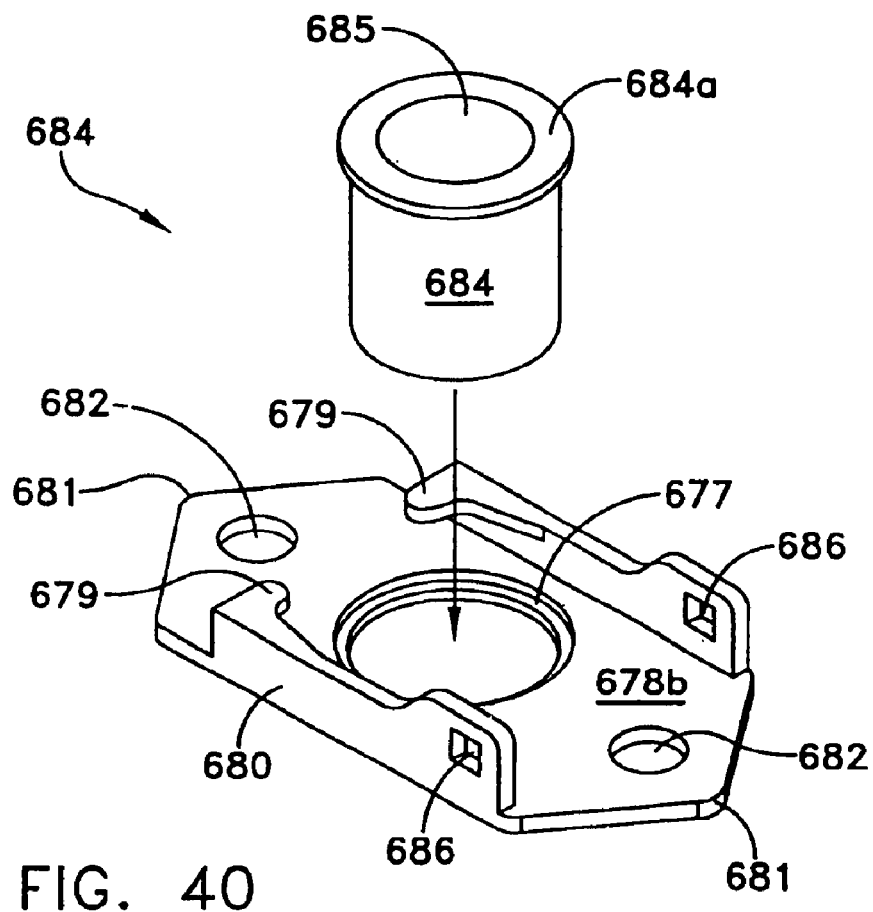
FIG. 40 is an exploded perspective view of the bracket shown in FIG. 39.
Figure 39:
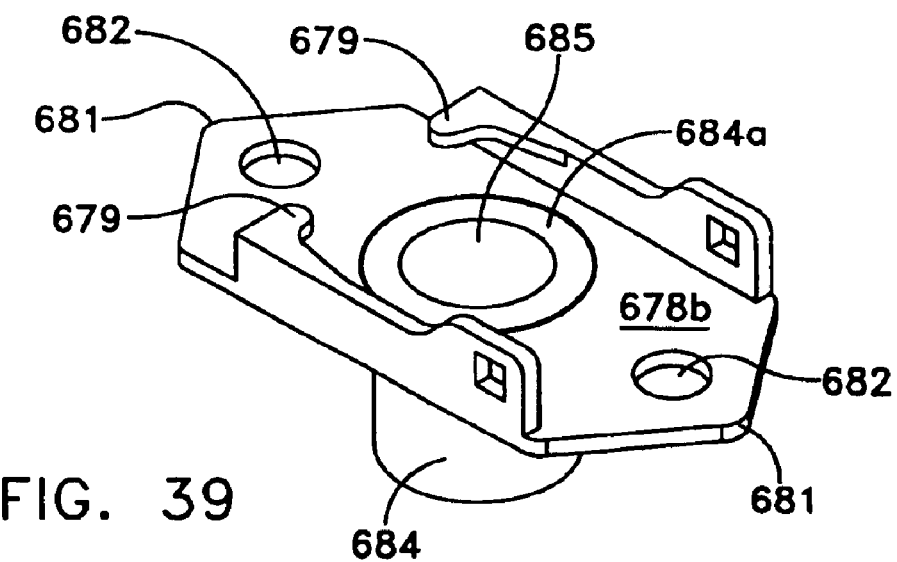
FIG. 39 is a perspective view of another embodiment of a non-unitary bracket.
Figure 41:
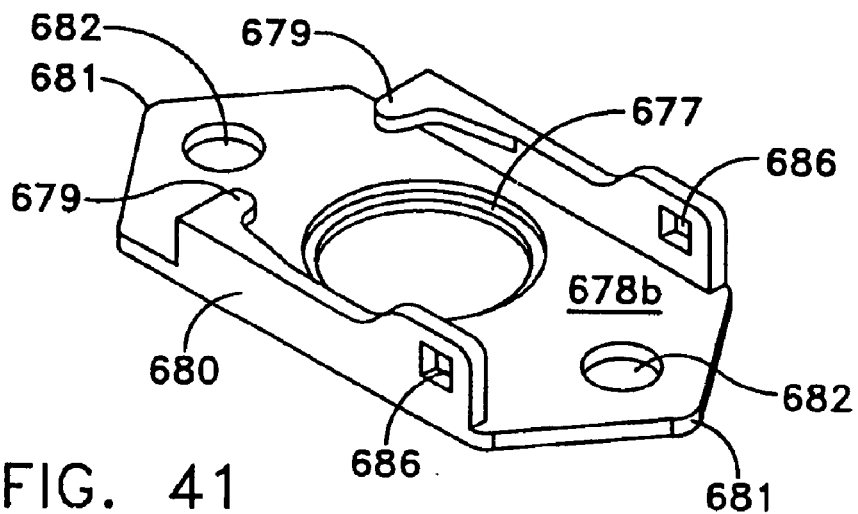
FIG. 41 is a perspective view of the bracket portion of the bracket shown in FIG. 40.
Figure 42:
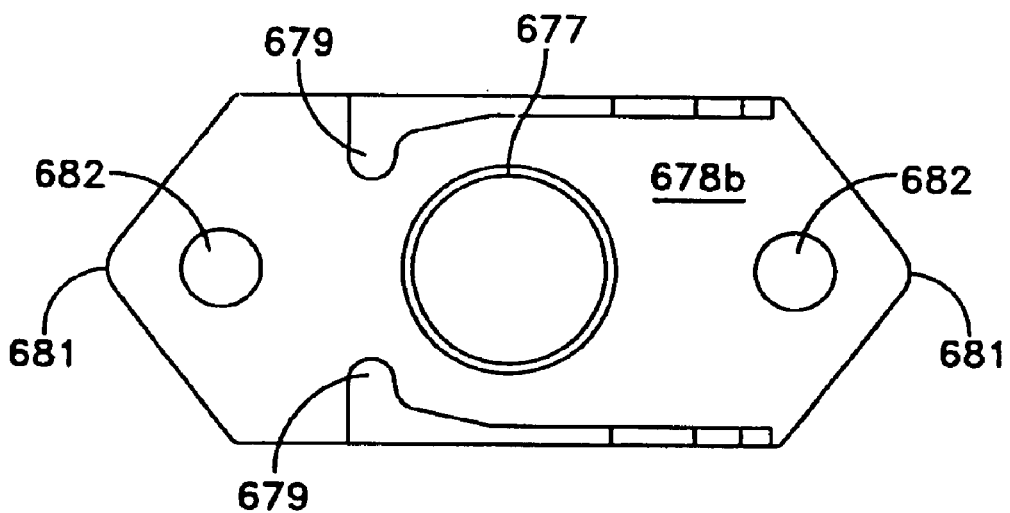
FIG. 42 is a top view of the bracket portion shown in FIG. 41.
Figure 43:
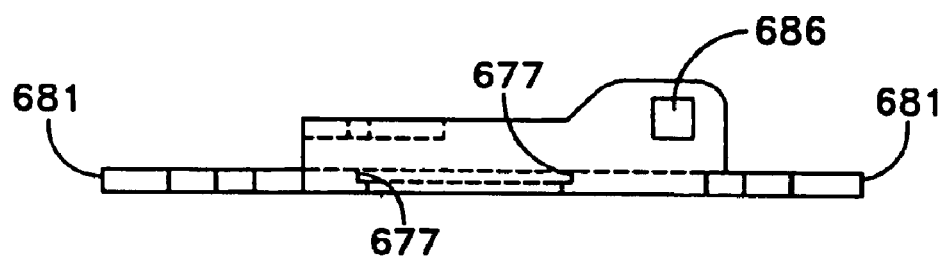
FIG. 43 is a side view of the bracket portion shown in FIG. 41.

Referring to FIGS. 36–38, bracket portion 570a includes substantially planar upper portion 578 having upper and lower surfaces 578a,b with two opposed sidewalls 580 extending perpendicularly therefrom. A bore 577 extends from upper surface 578a through lower surface 578b to define a bracket opening for receiving collar 584. Bore 577 includes a recess 577a against which flange 584a rests or is friction fitted with, when assembled. As in previous embodiments, the substantially planar upper portion 578 includes a projection 581 extending outwardly from one end. Projection. 581 includes a rivet bore 582 for securing bracket 570 to, for example, a panel. Each sidewall 580 includes at least one slot 586 for receiving retaining clamp 572. Two opposed inwardly projecting engagement tabs 579 extend from each sidewall 580 opposite projection 581 and parallel to upper portion 578. As in a previous embodiment, retaining clamp 572 preferably has a substantially U-shape with outwardly extending opposing upper tips 573. Tips 573 act as engagement members for engaging slots 586 of bracket portion 570.

FIGS. 39–43 show a non-unitary bracket configuration adapted for use in the fastening assemblies shown in FIGS. 1–24, provided the diamond-shaped retaining ring is replaced with a U-shaped retaining ring as shown in some of the foregoing embodiments. Where elements are similar to those in the previous embodiment are similar, they are preceded by the number "6."

Figure 45:
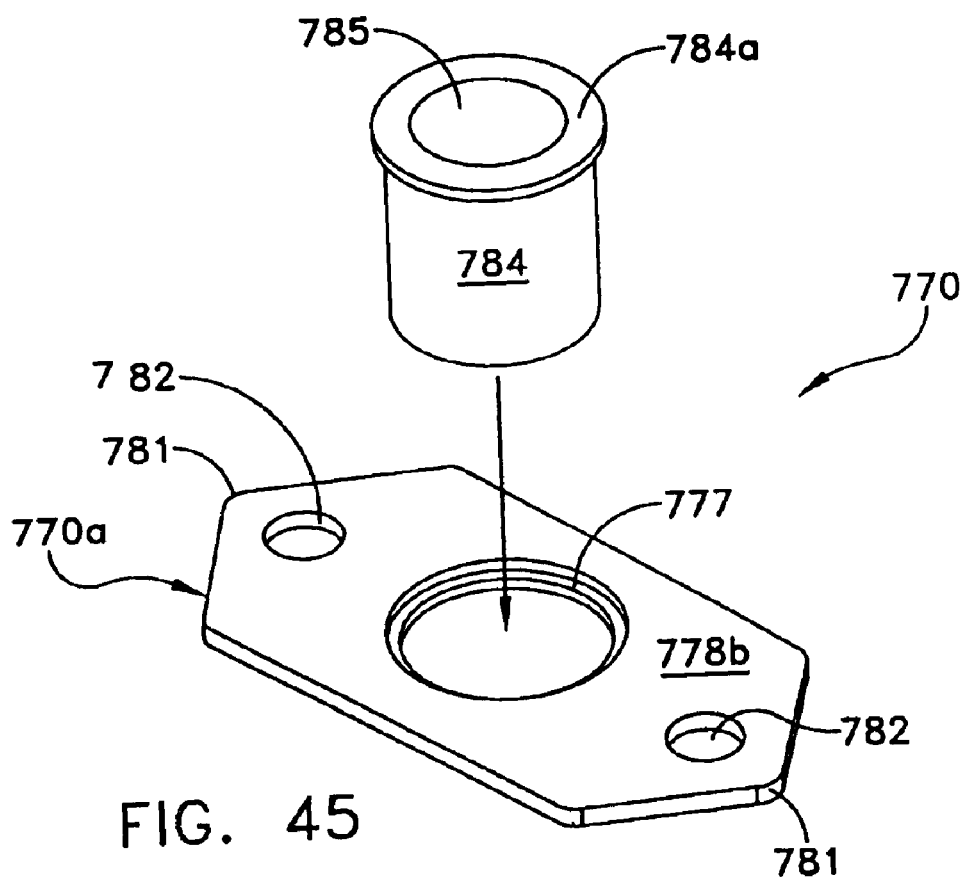
FIG. 45 is an exploded perspective view of the bracket shown in FIG. 44.
Figure 44:
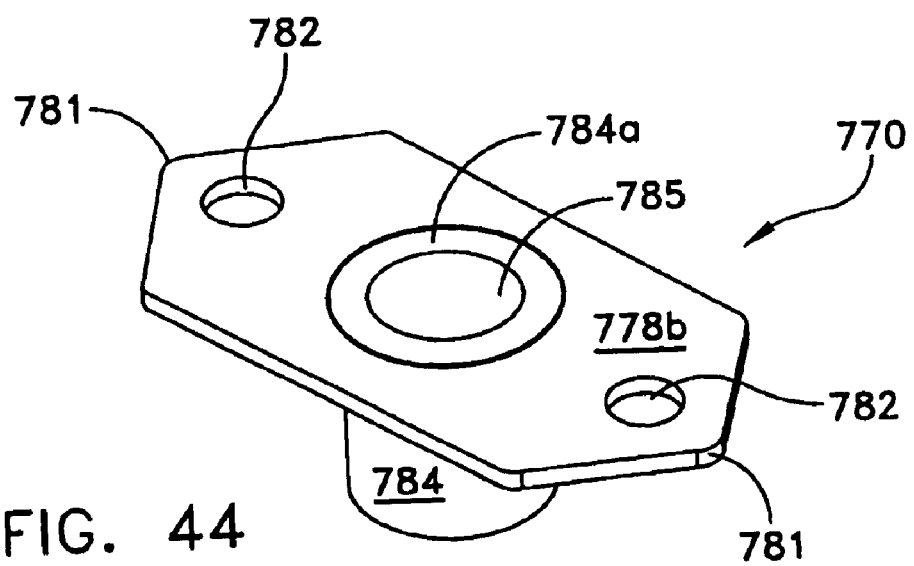
FIG. 44 is a perspective view of another embodiment of a non-unitary bracket.

FIGS. 44–45 show a non-unitary bracket configuration adapted for use in the fastening assemblies shown in FIGS. 30–33. Where elements are similar to those in the previous embodiment are similar, they are preceded by the number "7."

Referring now to FIGS. 46–49 taken together, an alternative and lower cost nut 874 is illustrated herein. Where elements are similar to those in the previous embodiment are similar, they are preceded by the number "8."

As shown, nut 874 includes a substantially planar upper portion 888 having upper and lower surfaces 888a,b. Upper portion 888 includes an arcuate channel 896 that corresponds substantially with the rivet bore of a bracket (not illustrated). A barrel 890 having an end 899 extends from lower surface 888b. Barrel 890 includes a sidewall 894 defining an axial bore 890a that may be substantially cylindrical as shown, or other shapes such as, for example, hexagonal. Bore 890a includes a threaded interior surface 892 extending from upper portion 888 at least partially to opposing end 899, terminating in a recessed region 891 for receiving cylindrical nut element 874a therein. To assemble nut 874, nut element is positioned in recessed region 891, and the edge of sidewall 894 is crimped or bent downwardly toward nut element 874a, which restricts the movement of the nut element in the nut. Thereafter, indentations 893 may be formed in the downwardly bent surface, which indentations function as anti-rotation dimples.

It will be apparent from the present disclosure that it is possible to adapt nut 874 for use in any of the other embodiments described herein by varying the shape of the upper planar portion 888. When using the present nut in any of the foregoing fastening assemblies, it is not necessary to use the spring or coil as used in previous embodiments. Preferably in the present embodiment, nut element 874a may be formed from a non-metal material with a high memory value. One preferred material is VESPEL. Use of a non-metal material eliminates the problem of wear between the surfaces of the coil and the stud and inner threaded surface of the barrel. In addition, use of the non-metal material with a high memory value provide an alternative method for achieving a high prevailing torque and breakaway torque. This provides high reusability of the assembly, especially in high vibrations areas.

Figure 50:
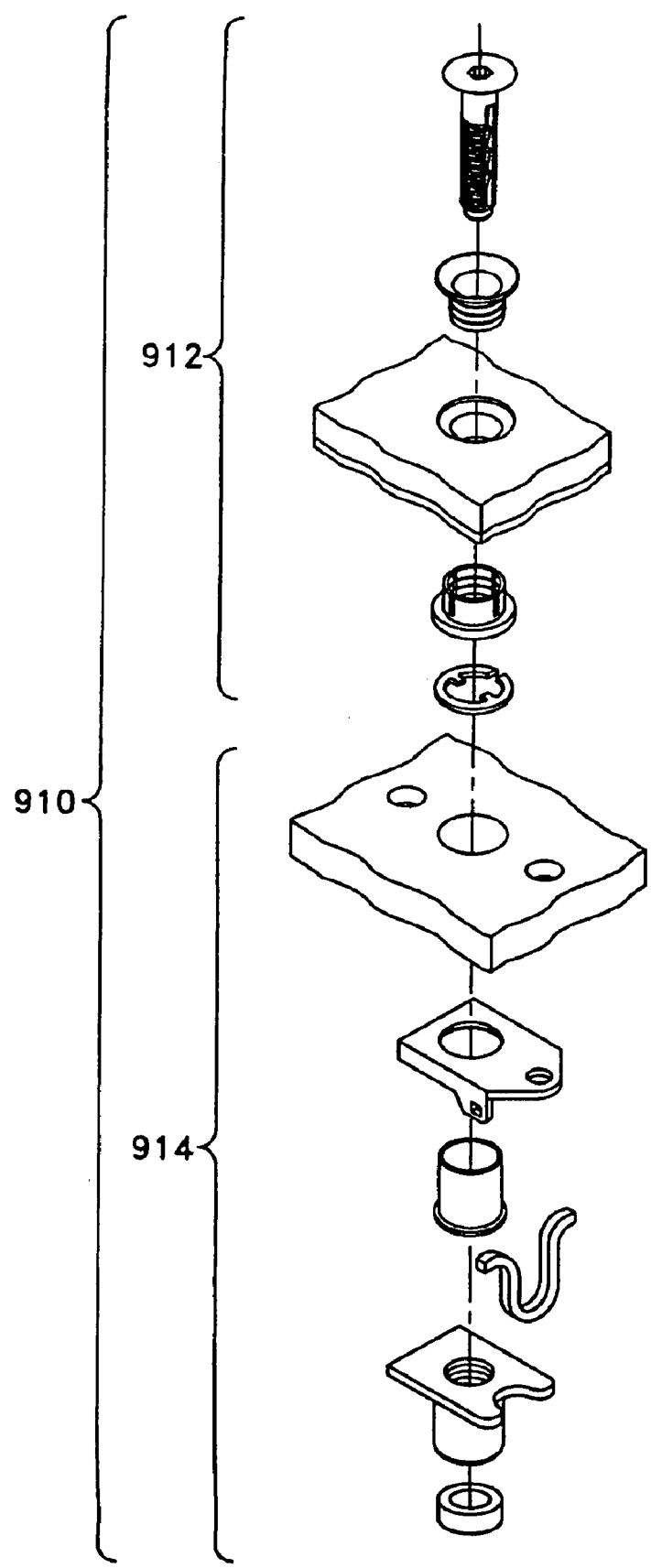
FIG. 50 is an exploded view of another embodiment of a fastening assembly according to the present disclosure, including the bracket shown in FIGS. 34–38 and the nut shown in FIGS. 46–49.
Figure 51:
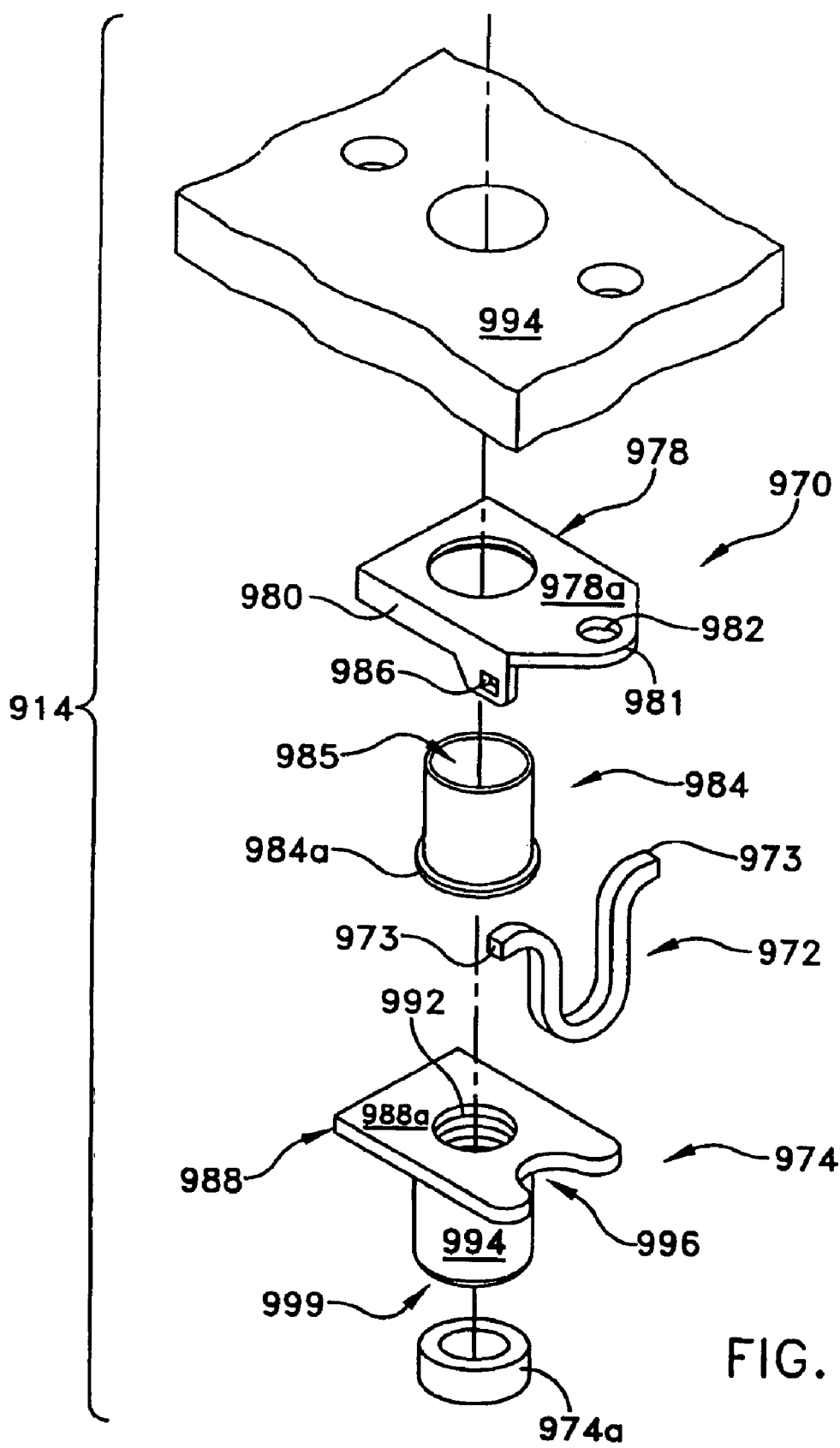
FIG. 51 is an exploded view of the receptacle assembly of the fastening assembly shown in FIG. 50.
Figure 52:
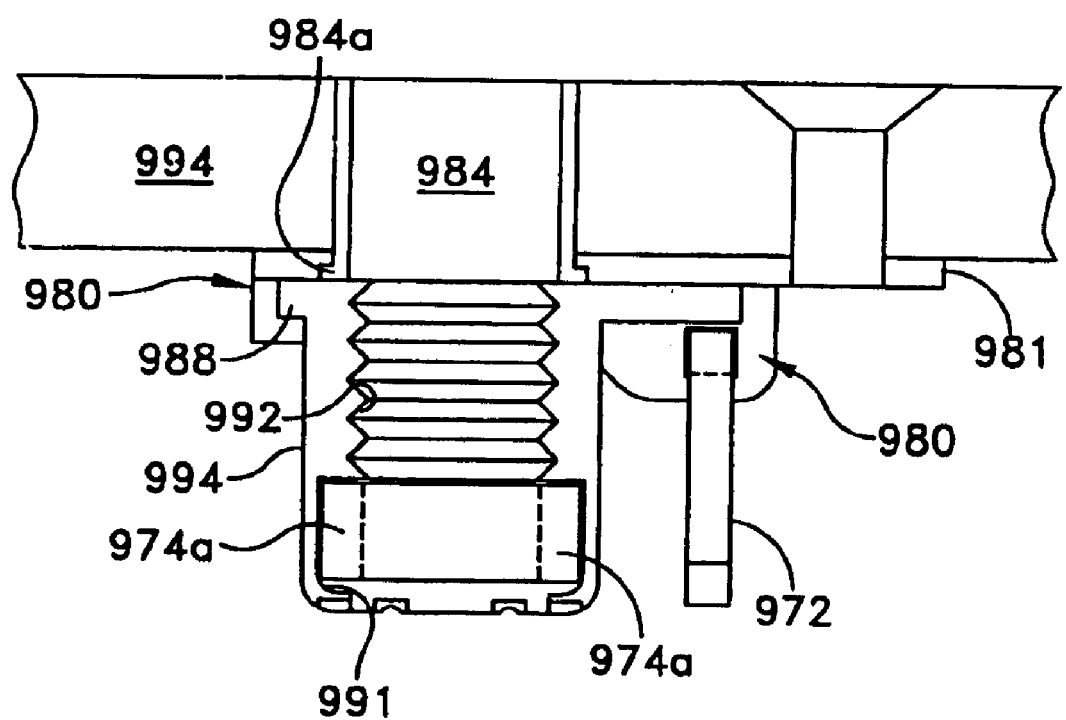
FIG. 52 is a side schematic view of the receptacle assembly shown in FIG. 51, shown in an assembled configuration.

A preferred embodiment of a fastening assembly according to the present disclosure is indicated generally at 910 in FIG. 50. Where elements are similar to those in the previous embodiment are similar, they are preceded by the number "9." As shown, fastening assembly 910 includes a stud assembly indicated generally at 912 and a receptacle assembly indicated generally at 914. The present embodiment is illustrated using the stud assembly illustrated in FIGS. 1–10 (and others), but it will be apparent that the stud assembly illustrated in FIGS. 11–18 may be used as well.

Receptacle assembly 914 is illustrated in greater detail in FIGS. 27–28. As shown, receptacle assembly 914 includes a bracket 970, a retaining clamp 972 and a nut 974 (including nut element 974a). As shown, bracket 970 includes a substantially planar upper portion 978 from which two opposed sidewalls 980 extend perpendicularly therefrom. The substantially planar upper portion 978 includes a projection 981 extending outwardly from one end. Projection 981 includes a rivet bore 982 for securing bracket 970 to, for example, a panel. Bracket 970 also includes a collar 984 which, when inserted into bracket 970, extends upwardly from upper portion 978 to define a bracket opening 985 for receiving stud 914 therethrough. Each sidewall 980 includes at least one slot 986 for receiving retaining clamp 972 as will be described in greater detail below. Two opposed inwardly projecting engagement tabs 979 extend from each sidewall 980 opposite projection 981 and parallel to upper portion 978.

In the present embodiment, retaining clamp 972 preferably has a substantially U-shape with outwardly extending opposing upper tips 973. Tips 973 act as engagement members for engaging slots 986 of bracket 970.

As shown, nut 974 includes a substantially planar upper portion 988 having upper and lower surfaces 988a,b. Upper portion 988 includes an arcuate channel 996 that corresponds substantially with rivet bore 982 of bracket 970. A barrel 990 having an end 999 extends from lower surface 988b. Barrel 990 includes a sidewall 994 that may be substantially cylindrical as shown, or other shapes such as, for example, hexagonal. Barrel 990 also a threaded interior surface 992 extending from upper portion 988 at least partially to opposing end 999, terminating in a recessed region 991 for receiving cylindrical nut element 974a therein.

To assemble receptacle assembly 914, nut 974 is slidably inserted into bracket 970 between opposing sidewalls 980 until nut 974 abuts engagement tabs 979. Tips 973 of retaining clamp 972 may then be engaged with slots 986.

Figure 53:
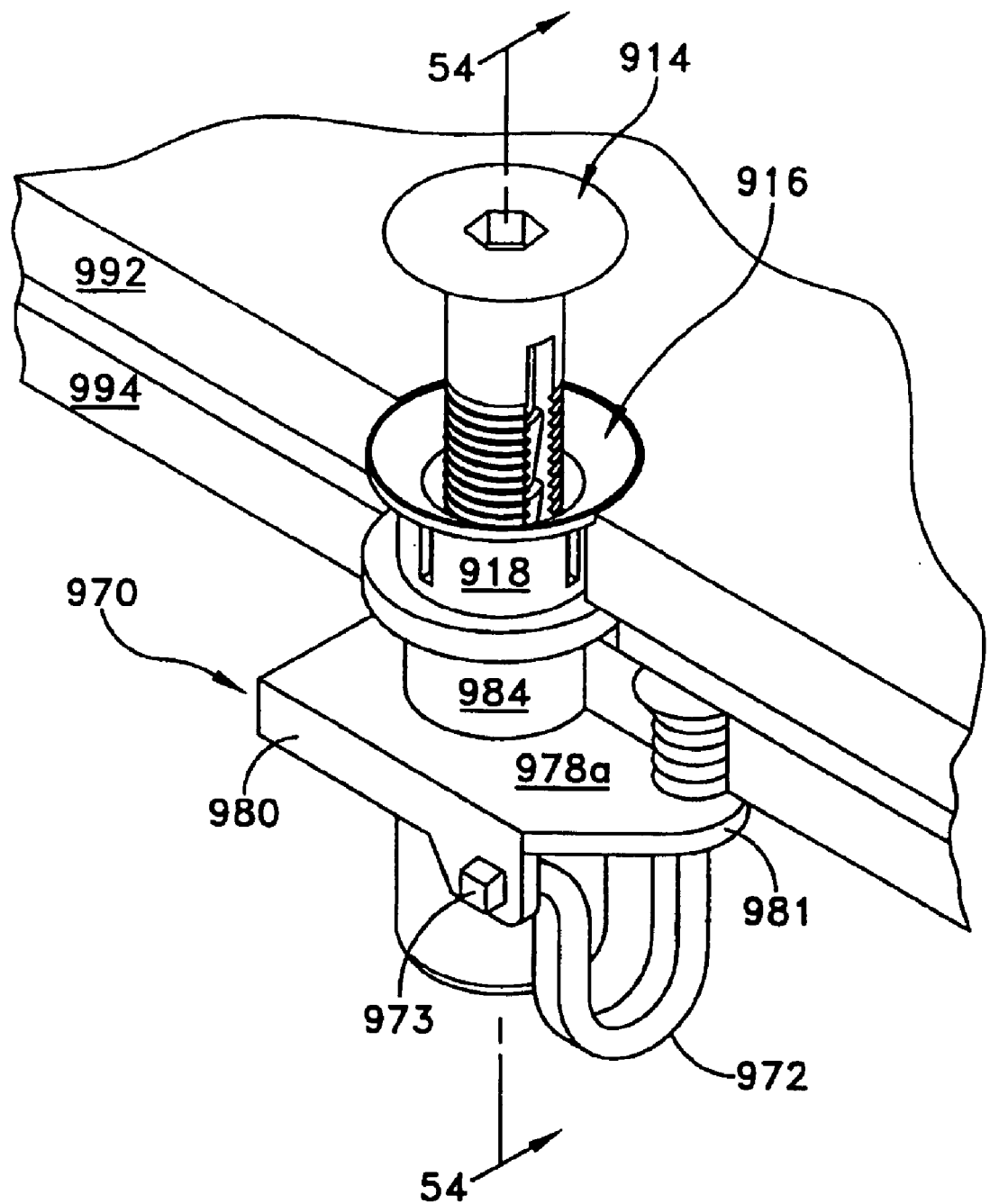
FIG. 53 is a perspective view of the fastening assembly shown in FIG. 51, attached to a cover and substructure.

FIG. 53 illustrates a perspective view of stud assembly 912 and receptacle assembly 914 holding a cover 992 to a panel 994. As shown, when assembled, opposing sidewalls 980 limit lateral movement of nut 974, engagement tabs 979 limit longitudinal movement of nut 973 in one direction, and retaining clamp 972 limits longitudinal movement of nut 974 in the opposite direction.

Figure 54:
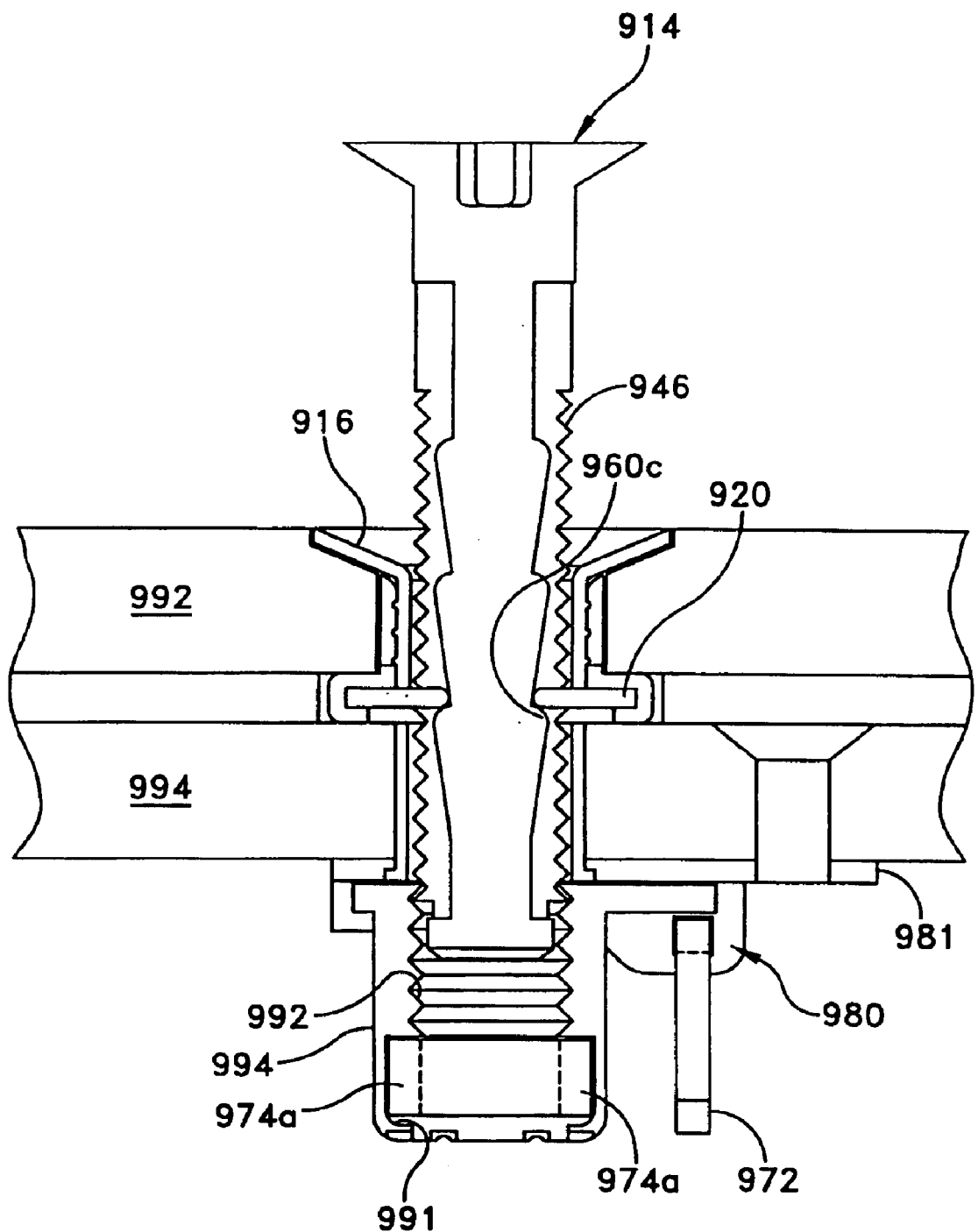
FIG. 54 is a side schematic view of the fastening assembly shown in FIG. 50, showing the stud in one predetermined extended position.

FIG. 54 illustrates the stud engaged by retaining ring in a first predetermined position.

Although particular embodiments of the disclosure have been described in detail for purposes of illustration, various changes and modifications may be made without departing from the scope and spirit of the disclosure. For example, all combinations and permutations of the studs, brackets, receptacles, stud assemblies and receptacle assemblies may be interchanged with each other, perhaps with minor modifications as will be apparent from the present disclosure.

What is claimed is:

1. A fastening assembly, comprising:
a stud assembly including a stud, a first sleeve that is matingly engageable with a second sleeve, the second sleeve including an inwardly disposed channel for receiving a substantially circular retaining ring, the retaining ring including two oppositely disposed tabs protruding toward the center of the retaining ring; and
a receptacle assembly including a bracket constructed and arranged to be secured to a panel, an internally threaded nut, a retaining clamp for securing the nut in the bracket, and a coil constructed and arranged to be threaded into the nut, the bracket including a substantially planar upper portion with a collar extending from the upper portion and defining a bore for receiving the stud therethrough;

wherein the stud includes a base, a head, and a shank disposed therebetween, the shank including an exterior surface having a threaded section and a substantially smooth section adjacent the head end, the exterior surface including at least two longitudinal channels positioned opposite one another and extending from the base end into the substantially smooth section, each channel including an inner surface, opposing sidewalls and opposing end walls, both the sidewalls and the endwalls disposed substantially perpendicular to the inner surface, and each channel including at least two engagement members for engaging the tabs of the retaining ring, the engagement members being disposed between the opposing end walls whereby the ring can be retained at at least two different fixed axial positions between the end walls along the shank.

2. The fastening assembly of claim 1, wherein the at least two engagement members are defined by a plurality of lobes protruding from the interior surface of the channel.

3. The fastening assembly of claim 1, wherein the at least two engagement members are defined by a plurality of ribs protruding from the interior surface of the channel.

4. The fastening assembly of claim 1, wherein the substantially planar portion of the bracket includes a first projecting portion.

5. The fastening assembly of claim 4, wherein the bracket includes two opposing sidewalls extending downwardly from the substantially planar portion.

6. The fastening assembly of claim 5, wherein each sidewall includes at least one slot for receiving an engaging portion of the retaining clamp.

7. The fastening assembly of claim 4, wherein the first projecting portion includes a bore for receiving a fastening device for securing the bracket to a panel.

8. The fastening assembly of claim 7, wherein the substantially planar upper portion of the nut includes a substantially arcuate groove that corresponds to the bore in the first projecting portion of the bracket.

9. The fastening assembly of claim 4, wherein the substantially planar portion includes a second projecting portion opposite the first projecting portion.

10. The fastening assembly of claim 9, wherein each of the first and second projecting portions include a bore for receiving a fastening device for securing the bracket to a panel.

11. The fastening assembly of claim 9, wherein the substantially planar upper portion of the nut includes at least two substantially arcuate grooves that correspond to the bores in the first and second projecting portions of the bracket.

12. The fastening assembly of claim 1, wherein the collar and the bracket are unitary.

13. The fastening assembly of claim 1, wherein the collar and the bracket are integral.

14. The fastening assembly of claim 1, wherein the stud is solid.

* * * * *